(12) United States Patent
Park et al.

(10) Patent No.: US 12,262,264 B2
(45) Date of Patent: Mar. 25, 2025

(54) TIMING AND SYNCHRONIZATION PARAMETERS FOR HANDOVER IN NON-TERRESTRIAL NETWORK

(71) Applicant: QUALCOMM Incorporated, San Diego, CA (US)

(72) Inventors: Changhwan Park, San Diego, CA (US); Bharat Shrestha, San Diego, CA (US); Liangping Ma, San Diego, CA (US); Xiao Feng Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/901,673

(22) Filed: Sep. 1, 2022

(65) Prior Publication Data
US 2023/0133633 A1    May 4, 2023

Related U.S. Application Data

(60) Provisional application No. 63/263,571, filed on Nov. 4, 2021.

(51) Int. Cl.
*H04W 36/00* (2009.01)
*H04W 56/00* (2009.01)
*H04W 36/24* (2009.01)

(52) U.S. Cl.
CPC ... *H04W 36/0072* (2013.01); *H04W 56/0045* (2013.01); *H04W 36/249* (2023.05)

(58) Field of Classification Search
CPC .......... H04W 36/249; H04W 56/0045; H04W 36/0072
See application file for complete search history.

(56) References Cited

U.S. PATENT DOCUMENTS 12,096,289 B2 *  9/2024 Xu .................. H04W 36/08
12,096,290 B2 *  9/2024 Sedin .............. H04W 56/004
(Continued)

FOREIGN PATENT DOCUMENTS

EP          3799470 A1    3/2021
WO    WO-2021139665 A1   7/2021

OTHER PUBLICATIONS

International Search Report and Written Opinion—PCT/US2022/075892—ISA/EPO—Dec. 13, 2022.

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters. The UE may perform the handover with the target base station associated with the target non-terrestrial cell based at least in part on the timing and synchronization parameters for the target non-terrestrial cell. Numerous other aspects are described.

30 Claims, 11 Drawing Sheets

(56) References Cited

U.S. PATENT DOCUMENTS

| | | | |
|---|---|---|---|
| 2007/0123252 A1 | 5/2007 | Tronc et al. | |
| 2021/0136641 A1* | 5/2021 | Roy | H04W 36/083 |
| 2021/0297923 A1* | 9/2021 | Wei | H04W 84/005 |
| 2021/0315023 A1* | 10/2021 | Tesanovic | H04W 72/56 |
| 2022/0239417 A1* | 7/2022 | Cheng | H04L 1/1896 |
| 2022/0303000 A1* | 9/2022 | Matsuda | H04B 7/18541 |
| 2022/0345961 A1* | 10/2022 | Tao | H04B 7/1851 |
| 2022/0394579 A1* | 12/2022 | Fujishiro | H04W 48/20 |
| 2023/0164722 A1* | 5/2023 | Shin | G01S 19/258 |
| | | | 370/503 |
| 2024/0022972 A1* | 1/2024 | Yavuz | H04W 36/0061 |
| 2024/0204866 A1* | 6/2024 | Ciochina | H04B 7/1851 |
| 2024/0292361 A1* | 8/2024 | Wigard | H04B 7/18513 |

OTHER PUBLICATIONS

Thales: "Support of UE location in Non-Terrestrial Networks", 3GPP TSG-RAN WG2 Meeting #118-e, R2-2206202, 3rd Generation Partnership Project, Mobile Competence Centre, 650, Route Des Lucioles, F-06921 Sophia-Antipolis Cedex, France, vol. Ran WG2, No. eLocation, May 9, 2022-May 20, 2022, May 18, 2022, 22 Pages, XP052204846, Sections 16.14.2, 16.14.3 and 16.14.7.

* cited by examiner

TIMING AND SYNCHRONIZATION PARAMETERS FOR HANDOVER IN NON-TERRESTRIAL NETWORK

CROSS-REFERENCE TO RELATED APPLICATION

This patent application claims priority to U.S. Provisional Patent Application No. 63/263,571, filed on Nov. 4, 2021, entitled "TIMING AND SYNCHRONIZATION PARAMETERS FOR HANDOVER IN NON-TERRESTRIAL NETWORK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for signaling of timing and synchronization parameters for a handover in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a source base station, configuration information for a handover, wherein the configuration information indicates, for a target non-terrestrial cell, timing and synchronization parameters including a scheduling timing offset, a round trip time between a reference point and a target base station associated with the candidate target non-terrestrial cell, satellite ephemeris information, an ephemeris validity duration associated with the satellite ephemeris information, common timing advance parameters, and a common timing advance validity duration associated with the common timing advance parameters. The one or more processors may be configured to perform the handover with the target base station associated with the target non-terrestrial cell based at least in part on the timing and synchronization parameters for the target non-terrestrial cell.

Some aspects described herein relate to a base station. The base station may include a memory and one or more processors coupled to the memory. The one or more processors may be configured to receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters. The one or more processors may be configured to transmit, to a UE, configuration information for the handover, wherein the configuration information identifies the timing and synchronization parameters for the target non-terrestrial cell.

Some aspects described herein relate to a method of wireless communication performed by a UE. The method may include receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters. The method may include performing the handover with the target base station associated with the target non-terrestrial cell based at least in part on the timing and synchronization parameters for the target non-terrestrial cell.

Some aspects described herein relate to a method of wireless communication performed by a base station. The method may include receiving, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters. The method may include transmitting, to a UE, configuration information for the handover, wherein the configuration information identifies the timing and synchronization parameters for the target non-terrestrial cell.

Some aspects described herein relate to a non-transitory computer-readable medium that stores a set of instructions for wireless communication by a UE. The set of instructions, when executed by one or more processors of the UE, may cause the UE to receive, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters. The set of instructions, when executed by one or more processors of the UE, may cause the UE to perform the handover with the target base station associated with the target non-terrestrial cell based at least in part on the timing and synchronization parameters for the target non-terrestrial cell.

Some aspects described herein relate to a non-transitory computer-readable medium that stores a set of instructions for wireless communication by a base station. The set of instructions, when executed by one or more processors of the base station, may cause the base station to receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters. The set of instructions, when executed by one or more processors of the base station, may cause the base station to transmit, to a UE, configuration information for the handover, wherein the configuration information identifies the timing and synchronization parameters for the target non-terrestrial cell.

Some aspects described herein relate to an apparatus for wireless communication. The apparatus may include means for receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters. The apparatus may include means for performing the handover with the target base station associated with the target non-terrestrial cell based at least in part on the timing and synchronization parameters for the target non-terrestrial cell.

Some aspects described herein relate to an apparatus for wireless communication. The apparatus may include means for receiving, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters. The apparatus may include means for transmitting, to a UE, configuration information for the handover, wherein the configuration information identifies the timing and synchronization parameters for the target non-terrestrial cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
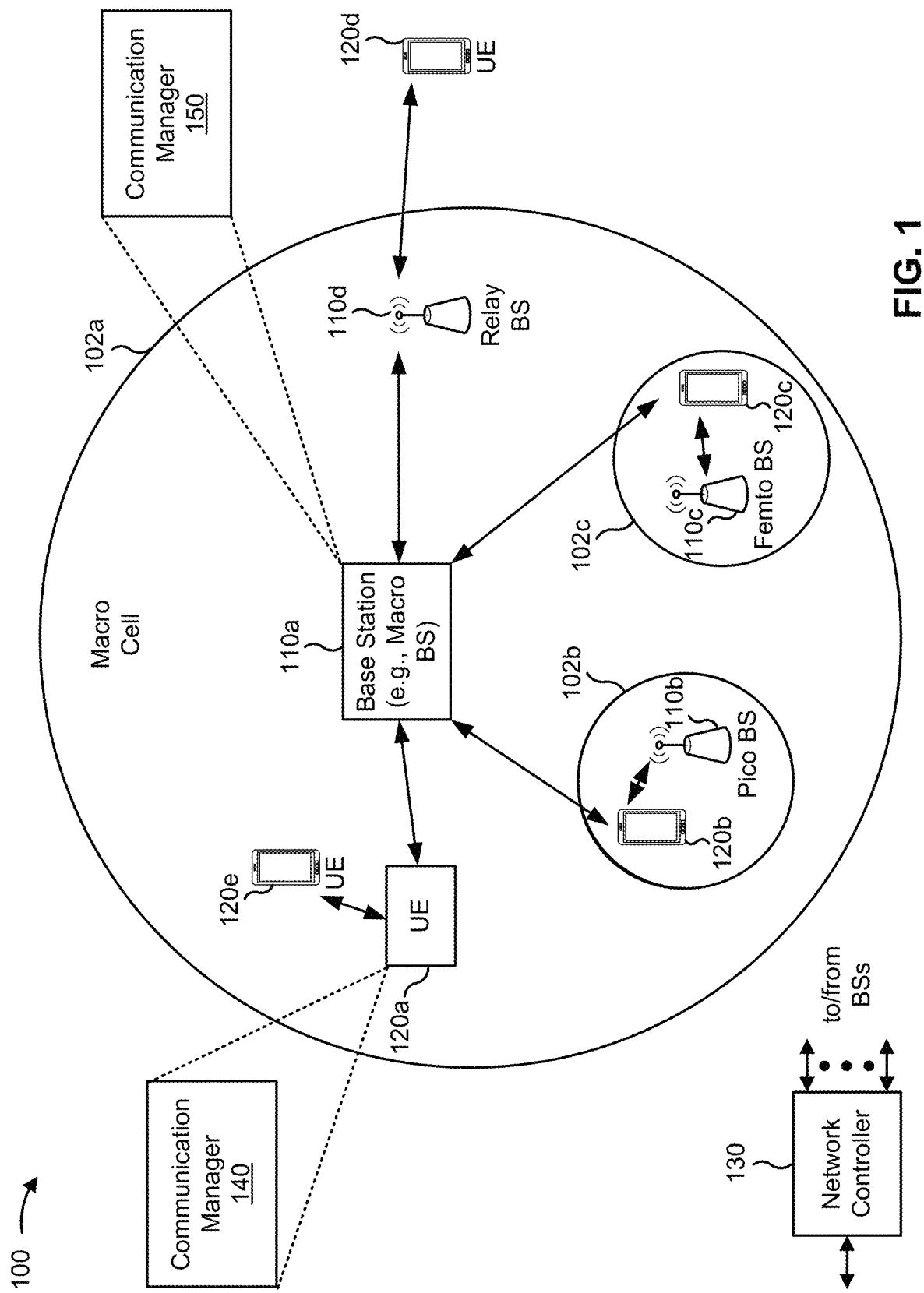
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station") and/or a relay station (referred to herein, interchangeably, as a "non-terrestrial relay station"). As used herein, "NTN" may refer to a network for which access is facilitated by a non-terrestrial BS and/or a non-terrestrial relay station.

The wireless network 100 may include any number of non-terrestrial wireless communication devices. A non-terrestrial wireless communication device may include a satellite and/or a high-altitude platform (HAP). A HAP may include a balloon, a dirigible, an airplane, and/or an unmanned aerial vehicle. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, and/or one or more components and/or devices included in a core network of wireless network 100.

In some aspects, the UE 120 may include a communication manager 140. As described in more detail elsewhere herein, the communication manager 140 may receive, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters; and perform the handover with the target base station associated with the target non-terrestrial cell based at least in part on the timing and synchronization parameters for the target non-terrestrial cell. Additionally, or alternatively, the communication manager 140 may perform one or more other operations described herein.

In some aspects, the base station 110 may include a communication manager 150. As described in more detail elsewhere herein, the communication manager 150 may receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters; and transmit, to a UE, configuration information for the handover, wherein the configuration information identifies the timing and synchronization parameters for the target non-terrestrial cell. Additionally, or alternatively, the communication manager 150 may perform one or more other operations described herein.

As indicated above, FIG. 1 is provided as an example. Other examples may differ from what is described with regard to FIG. 1.

Figure 2:
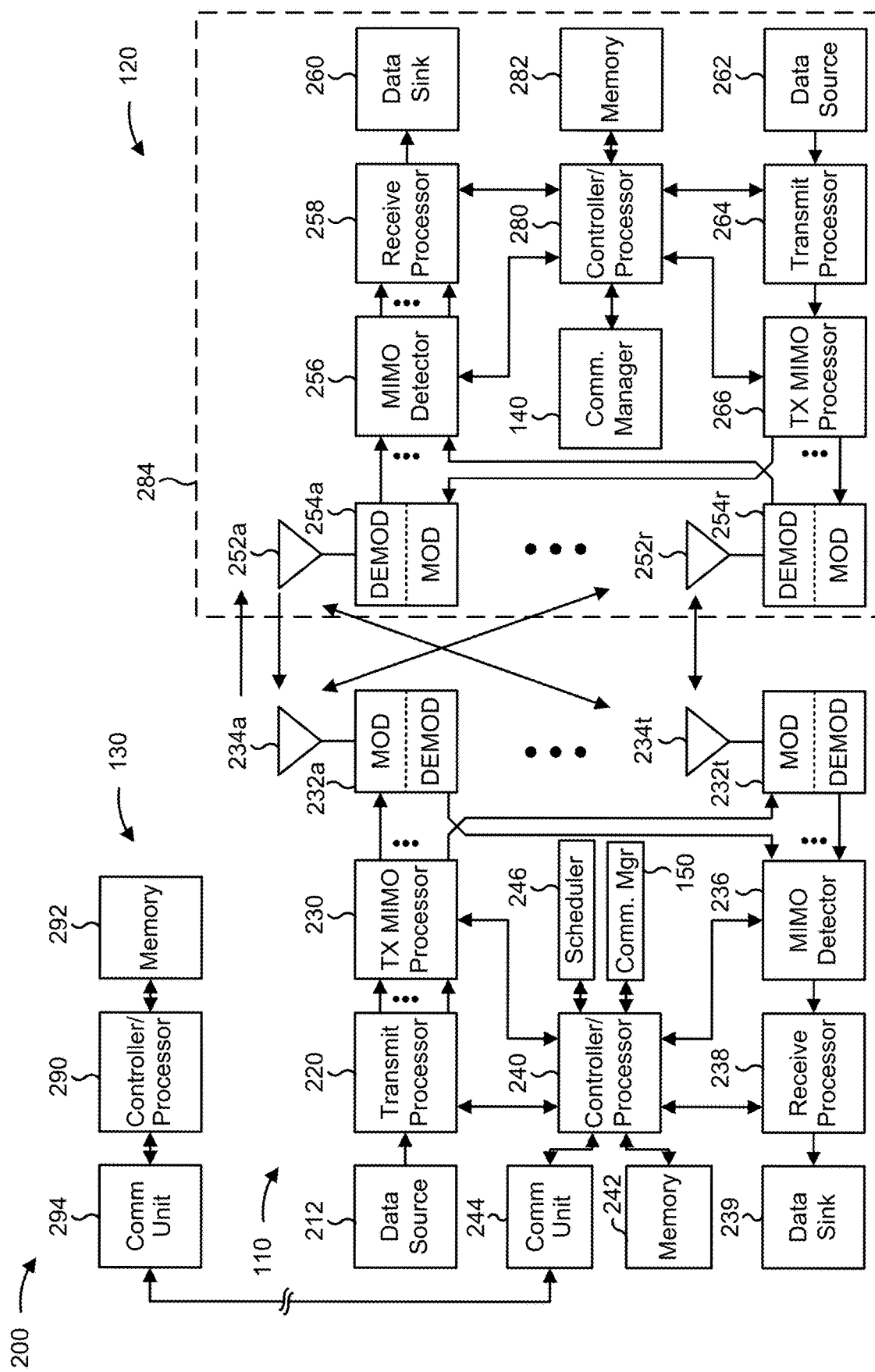
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with signaling of timing and synchronization parameters for a handover in an NTN, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters; and/or means for performing the handover with the target base station associated with the target non-terrestrial cell based at least in part on the timing and synchronization parameters for the target non-terrestrial cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters; and/or means for transmitting, to a UE, configuration information for the handover, wherein the configuration information identifies the timing and synchronization parameters for the target non-terrestrial cell. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to an aggregated base station, a disaggregated base station, or to one or more units of a disaggregated base station (such as one or more central units (CUs), one or more distributed units (DUs), one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more DUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
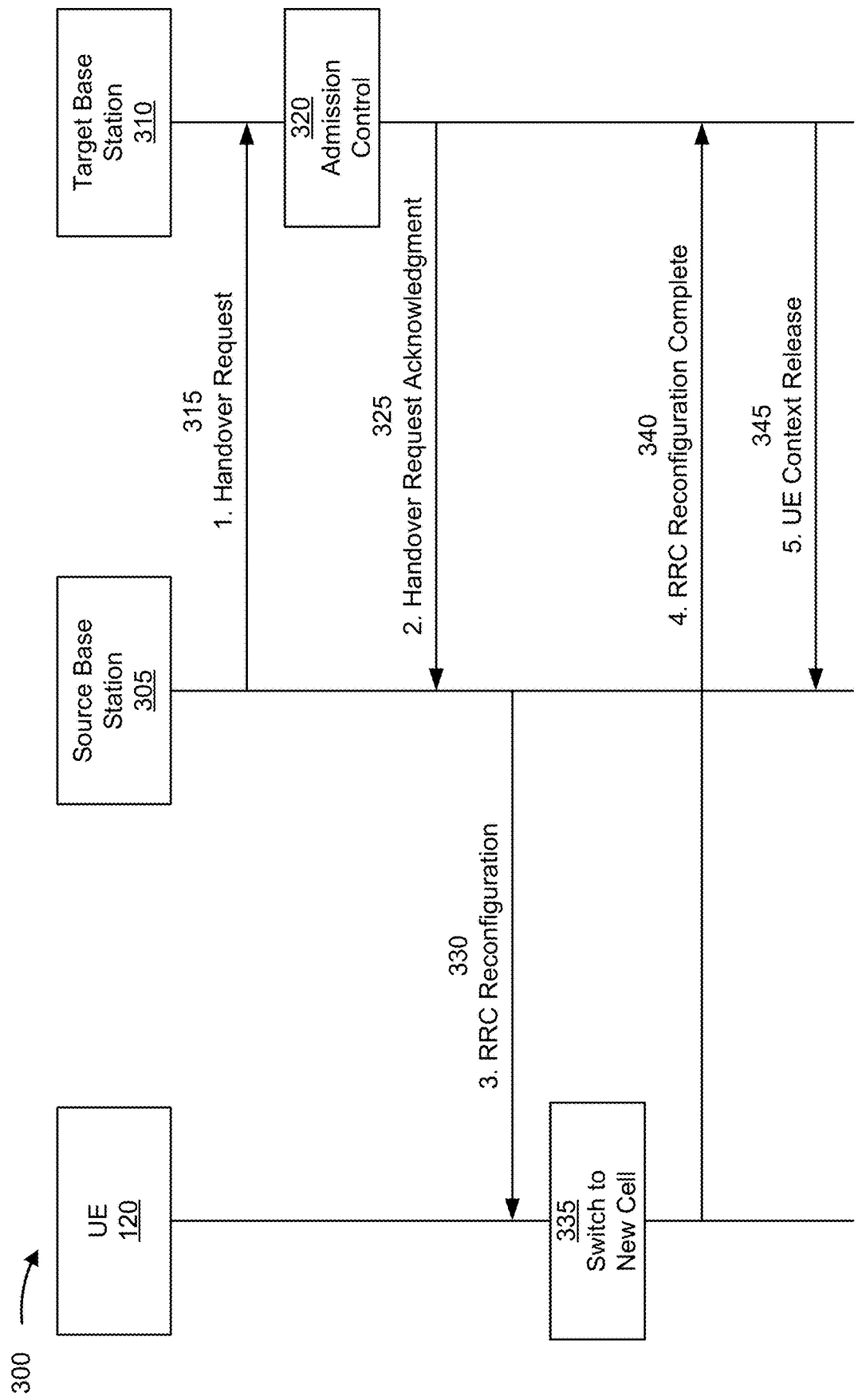
FIG. 3 is a diagram illustrating an example of a handover procedure, in accordance with the present disclosure.

FIG. 3 is a diagram illustrating an example 300 of a handover procedure, in accordance with the present disclosure. The handover procedure may be performed by a UE 120, a source base station 305 (for example, a base station 110), and a target base station 310 (for example, another base station 110). As used herein, "source base station" may refer to a serving base station or a base station with which the UE 120 currently has an active or established connection. "Target base station" may refer to a base station that is identified as a base station to replace a serving base station for a UE 120 (for example, as part of the handover procedure). For example, the source base station 305 may be associated with a current serving cell for the UE 120, and the target base station 310 may be associated with a target cell to become a next serving cell for the UE 120 via the handover procedure.

As shown in FIG. 3, in a first operation 315, the source base station 305 may initiate handover of the UE 120 to the target base station 310 by transmitting a handover request message to the target base station 310. In some examples, the source base station 305 may transmit the handover request message to the target base station 310 (e.g., to trigger the handover to the target base station 310) based at least in part on a measurement report received from the UE 120. The measurement report may indicate, for example, an RSRP parameter, an RSRQ parameter, an RSSI parameter, and/or a signal-to-interference-plus-noise-ratio (SINR) parameter (e.g., for the serving cell and/or one or more neighbor cells). The source base station 305 may transmit the handover request message to the target base station 310 over an Xn, X2, or a next generation application protocol (NGAP) interface, among other examples. In a second operation 320, the target base station 310 may perform admission control procedures associated with the handover based at least in part on receiving the handover request message. In a third operation 325, the target base station 310 may transmit a handover request acknowledgment message to the source base station 305 (for example, if the admission control procedures indicate that the target base station 310 can accept the handover of the UE 120). The handover request acknowledgment message may include a radio resource control (RRC) configuration for connection to the target base station 310.

In a fourth operation 330, the source base station 305 may transmit the RRC configuration to the UE 120 by forwarding the RRC configuration included in the handover request acknowledgment message to the UE 120 in an RRC reconfiguration message. The RRC reconfiguration message may include a handover command instructing the UE 120 to execute the handover from the source base station 305 to the target base station 310. In a fifth operation 335, the UE 120 may change an RRC connection from the source base station 305 to the target base station 310 based at least in part on the RRC configuration. For example, the UE 120 may establish an RRC connection with the target base station 310 by performing a random access channel (RACH) procedure with the target base station 310 (e.g., using a physical RACH (PRACH) preamble assignment included in the RRC reconfiguration message). In a sixth operation 340, the UE 120 may transmit an RRC reconfiguration complete message to the target base station 310. The RRC reconfiguration complete message may indicate that the UE 120 has changed the RRC connection from the source base station 305 to the target base station 310. In a seventh operation 345, the target base station 310 may transmit a UE context release message to the source base station 305. The UE context release message may indicate that the handover of the UE 120 to the target base station 310 was successful.

In some examples, the UE 120 may be unable to successfully connect with the target base station 310. For example, the UE 120 may attempt to connect with the target base station 310 (for example, by performing a RACH procedure with the target base station 310), but the attempt to connect with the target base station 310 may fail. If the UE 120 is unable to successfully connect with the target base station 310, then the UE 120 may perform a connection re-establishment procedure to re-establish a connection with the source base station 305 or another base station 110. For example, the UE 120 may transmit an RRC re-establishment request message to the network (for example, to the source base station 305 or another base station 110). Additionally, the UE 120 may reset a medium access control (MAC) entity of the UE 120, release the RRC configuration for the handover procedure, suspend all radio bearers (except signaling radio bearer (SRB) type 0 (SRB0) in some examples), release a connection with any configured secondary cells (SCells), and/or release all other configurations stored by the UE 120, among other examples. Therefore, the UE 120 may re-establish an RRC connection (for example, with the source base station 305 or another base station 110) in the event that the handover procedure with the target base station 310 fails.

As indicated above, FIG. 3 is provided as an example. Other examples may differ from what is described with respect to FIG. 3.

Figure 4:
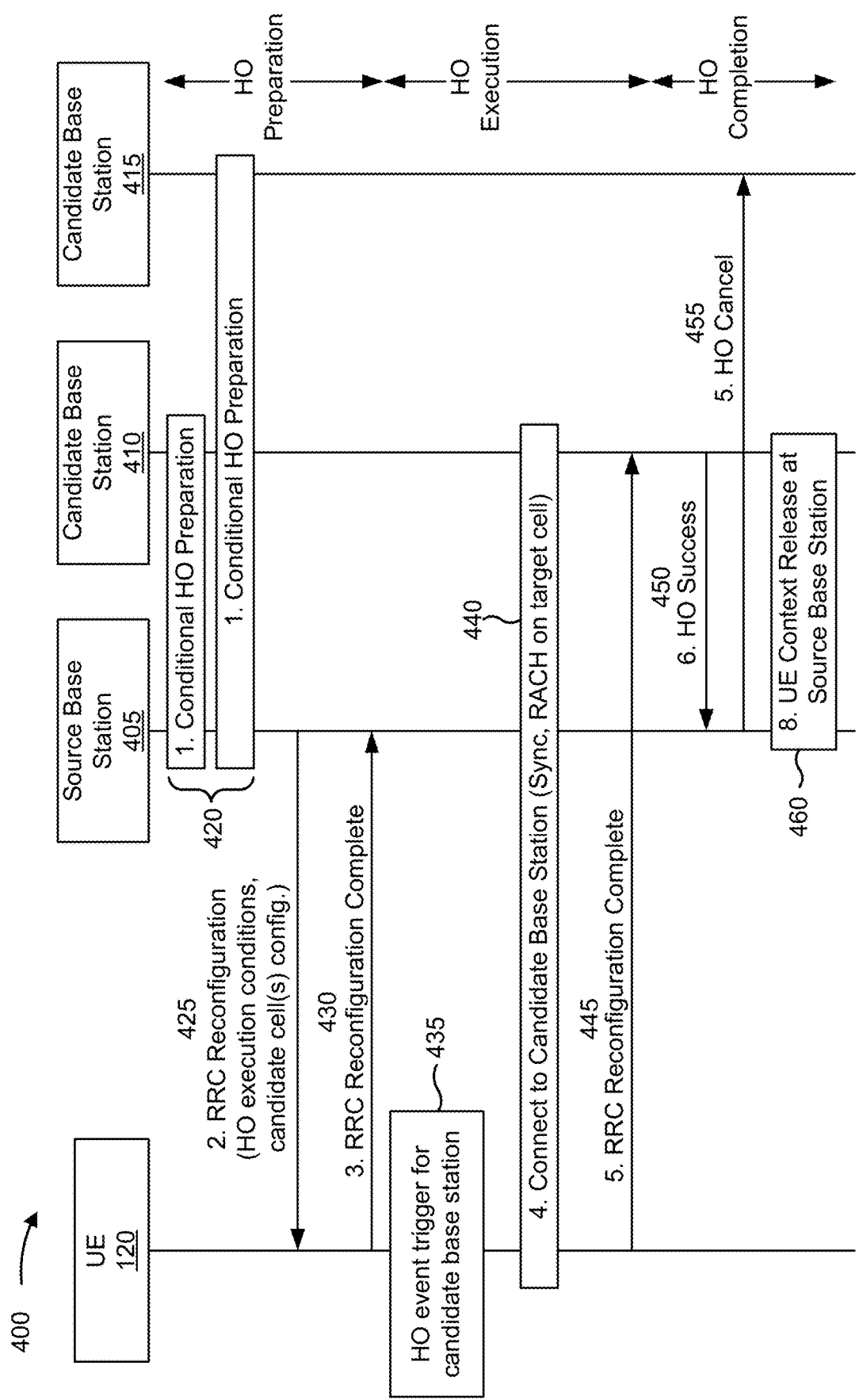
FIG. 4 is a diagram illustrating an example of a conditional handover procedure, in accordance with the present disclosure.

FIG. 4 is a diagram illustrating an example 400 of a conditional handover procedure, in accordance with the present disclosure. The conditional handover procedure may be performed by a UE 120, a source base station 405 (for example, a base station 110 or the source base station 405), and one or more candidate base stations 410 and 415. As used herein, "candidate base station" (or "candidate target base station") may refer to a base station that is a candidate to serve as a target base station for the UE as part of a handover procedure.

As shown in FIG. 4, in a first operation 420, the source base station 405 may communicate with a first candidate base station 410 and a second candidate base station 415 to prepare the first and second candidate base stations 410, 415 for a conditional handover of the UE 120. For example, the source base station 405 may transmit a handover request message to the first candidate base station 410 or the second candidate base station 415. The first candidate base station 410 or the second candidate base station 415 may transmit a handover request acknowledgment message to the source base station 405, as described above in connection with FIG. 3. In a second operation 425, the source base station 405 may transmit an RRC reconfiguration message to the UE 120. The RRC reconfiguration message may include a conditional handover configuration that indicates configurations for the candidate base stations 410 and 415, and indicates one or more criteria or execution conditions (for example, conditional thresholds) that trigger handover, among other examples. In a third operation 430, the UE 120 may transmit an RRC reconfiguration complete message to the source base station 405, which may indicate that the UE 120 has applied the RRC reconfiguration (for example, the conditional handover configuration).

In a fourth operation 435, the UE 120 may detect a conditional handover event for the first candidate base station 410. For example, the UE 120 may determine that the one or more criteria or execution conditions for triggering handover to the first candidate base station 410 are satisfied (for example, a measurement associated with a signal transmitted by the second candidate base station 415 may satisfy a threshold or may be greater than (by a threshold amount) a measurement associated with a signal transmitted by the source base station 405). In a fifth operation 440, the UE 120 may change an RRC connection from the source base station 405 to the first candidate base station 410, as described above in connection with FIG. 3, based at least in part on detecting the conditional handover event or execution condition for the first candidate base station 410. That is, the UE 120 may execute the handover upon detecting the conditional handover event, and not wait for an RRC reconfiguration message from the source base station 405. This may reduce handover latency.

In a sixth operation 445, the UE 120 may transmit an RRC reconfiguration complete message to the first candidate base station 410. The RRC reconfiguration complete message may indicate that the UE 120 has changed an RRC connection from the source base station 405 to the first candidate base station 410, as described above in connection with FIG. 3. In a seventh operation 450, the first candidate base station 410 may transmit a handover success message (for example, indicating successful handover of the UE 120) to the source base station 405. In an eight operation 455, the source base station 405 may transmit a handover cancel message to the second candidate base station 415. The handover cancel message may indicate that the second candidate base station 415 is to discard the handover request message (for example, transmitted in connection with the first operation 420). In a ninth operation 460, the source base station 405 and the first candidate base station 410 may perform a UE context release procedure to release the UE 120 context at the source base station 405.

In a similar manner as described above, in connection with FIG. 3, the UE 120 may be unable to establish a connection with the first candidate base station 410. For example, the handover procedure with the first candidate base station 410 may fail. In some examples, the UE 120 may attempt to perform a RACH procedure with the first candidate base station 410, but the RACH procedure may be unsuccessful. In some examples, rather than releasing one or more (or all) RRC configurations at the UE 120 when the handover procedure with the first candidate base station 410 fails, the UE 120 may maintain the conditional handover configuration. This may enable the UE 120 to continue to search for or measure candidate base stations indicated by the conditional handover configuration. For example, the UE 120 may detect a conditional handover event for the second candidate base station 415. For example, the UE 120 may determine that the one or more criteria or execution condition(s) for triggering handover to the second candidate base station 415 are satisfied (for example, after the handover attempt with the first candidate base station 410 fails). As the UE 120 has not released the conditional handover configuration, the UE 120 may change an RRC connection from the source base station 405 to the second candidate base station 415, as described above in connection with FIG. 4, based at least in part on detecting the conditional handover event for the second candidate base station 415. That is, the UE 120 may execute the handover upon detecting the conditional handover event, and not wait for an RRC reconfiguration message from the source base station 405. Moreover, the UE 120 may not wait for an additional conditional handover reconfiguration after the handover attempt with the first candidate base station 410 fails. This may reduce handover latency associated with conditional handovers.

As indicated above, FIG. 4 is provided as an example. Other examples may differ from what is described with respect to FIG. 4.

Figure 5:
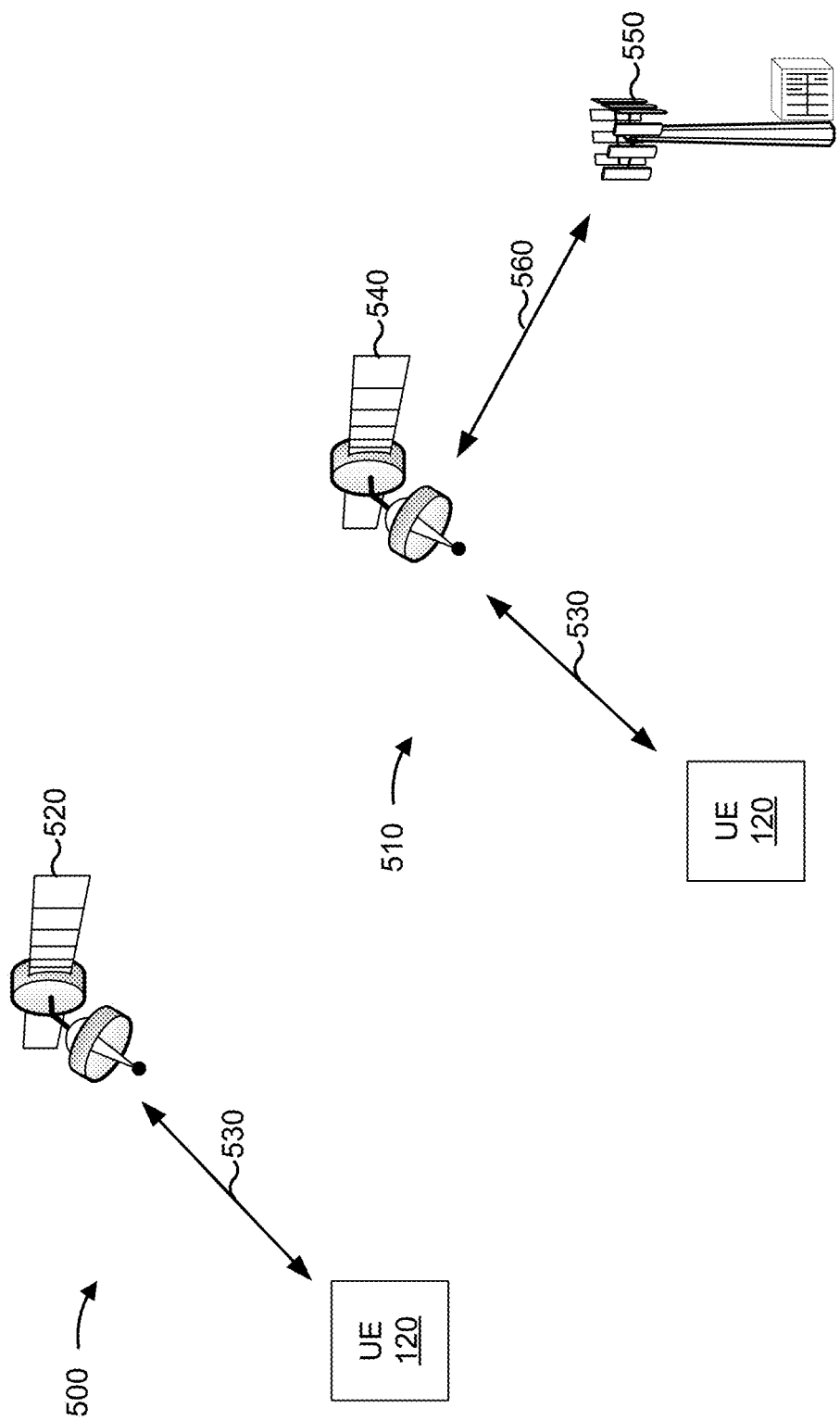
FIG. 5 is a diagram illustrating an example of a regenerative satellite deployment and an example of a transparent satellite deployment in a non-terrestrial network (NTN), in accordance with the present disclosure, in accordance with the present disclosure.

FIG. 5 is a diagram illustrating an example 500 of a regenerative satellite deployment and an example 510 of a transparent satellite deployment in an NTN, in accordance with the present disclosure.

Example 500 shows a regenerative satellite deployment. In example 500, a UE 120 is served by a satellite 520 via a service link 530. For example, the satellite 520 may include a base station 110 (e.g., BS 110a), a gNB, or the like. In some aspects, the satellite 520 may be referred to as a non-terrestrial base station, a regenerative repeater, and/or an on-board processing repeater. In some aspects, the satellite 520 may demodulate an uplink radio frequency signal and may modulate a baseband signal derived from the uplink radio signal to produce a downlink radio frequency transmission. The satellite 520 may transmit the downlink radio frequency signal on the service link 530. The satellite 520 may provide a cell that covers the UE 120.

Example 510 shows a transparent satellite deployment, which may also be referred to as a bent-pipe satellite deployment. In example 510, a UE 120 is served by a satellite 540 via the service link 530. The satellite 540 may be a transparent satellite. As used herein, "transparent satellite" (e.g., satellite 540) refers to any satellite that relays signals received from a base station or gateway (e.g., gateway 550) to a UE (e.g., UE 120) and/or relays signals received from a UE (e.g., UE 120) to a base station or gateway (e.g., gateway 550). The satellite 540 may relay a signal received from a gateway 550 via a feeder link 560. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 530 to a frequency of the uplink radio frequency transmission on the feeder link 560, and the satellite may amplify and/or filter the uplink radio frequency transmission. In some aspects, the UEs 120 shown in example 500 and example 510 may be associated with a Global Navigation Satellite System (GNSS) capability and/or a Global Positioning System (GPS) capability, though not all UEs have such capabilities. The satellite 540 may provide a cell that covers the UE 120.

The service link 530 may include a link between the satellite 540 and the UE 120, and may include one or more of an uplink or a downlink. The feeder link 560 may include a link between the satellite 540 and the gateway 550, and may include one or more of an uplink (e.g., from the UE 120 to the gateway 550) or a downlink (e.g., from the gateway 550 to the UE 120).

The feeder link 560 and the service link 530 may each experience Doppler effects due to the movement of the satellites 520 and 540, and potentially movement of a UE 120. These Doppler effects may be significantly larger than in a terrestrial network. The Doppler effect on the feeder link 560 may be compensated for to some degree, but the Doppler effect may still be associated with some amount of uncompensated frequency error. Furthermore, the gateway 550 may be associated with a residual frequency error, and/or the satellite 520/540 may be associated with an on-board frequency error. These sources of frequency error may cause a received downlink frequency at the UE 120 to drift from a target downlink frequency.

In some aspects, a device, such as an aircraft, drone, blimp, and/or hot air balloon, among other examples, may be used instead of or in addition to the transparent satellite 540 to relay signals received from a base station or gateway to a UE and/or relay signals received from a UE to a base station or gateway.

As indicated above, FIG. 5 is provided as an example. Other examples may differ from what is described with regard to FIG. 5.

Figure 6:
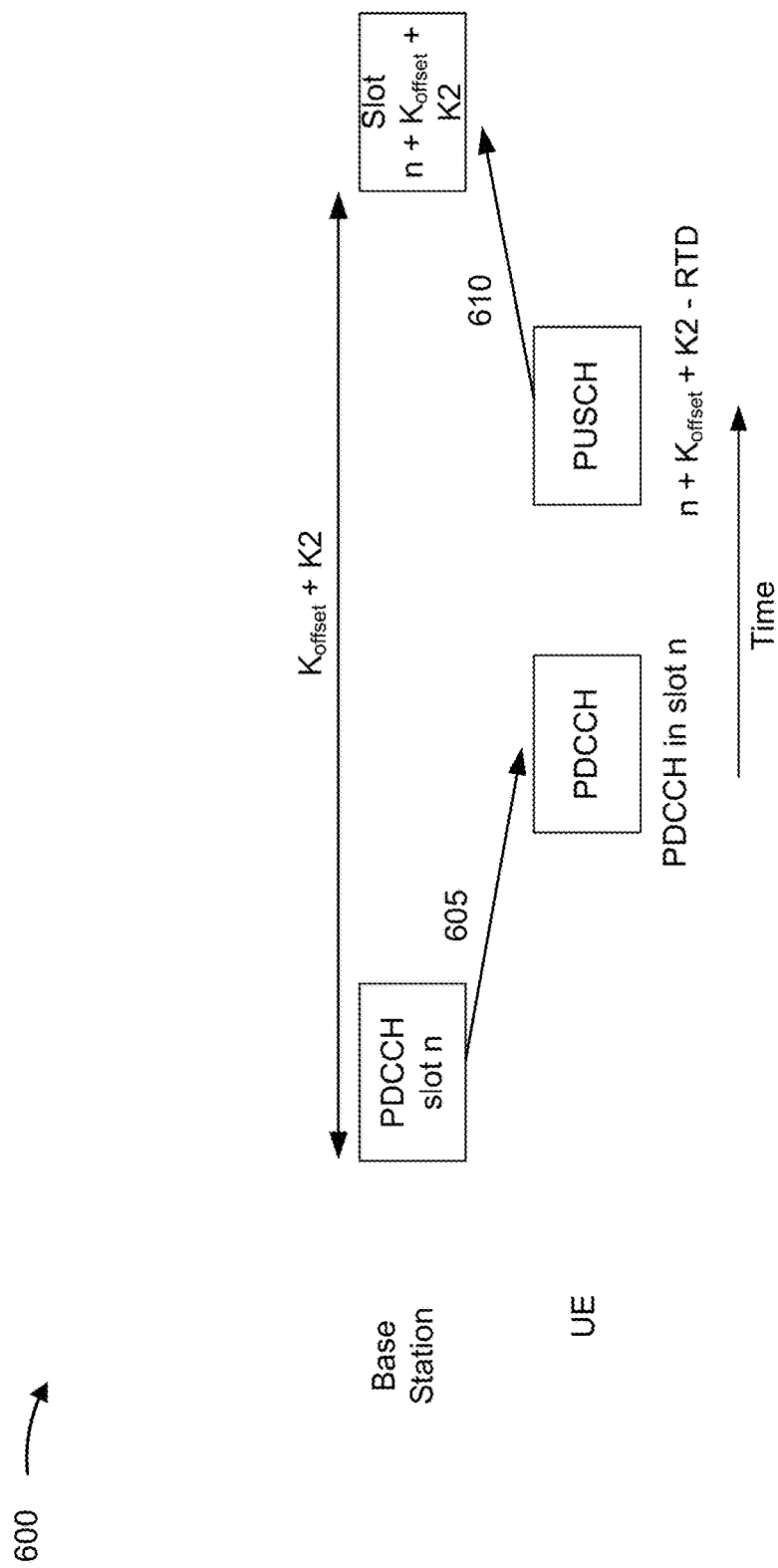
FIG. 6 is a diagram illustrating an example of a scheduling timing offset in an NTN, in accordance with the present disclosure.

FIG. 6 is a diagram illustrating an example 600 of a scheduling timing offset in an NTN, in accordance with the present disclosure. Downlink and uplink communications in an NTN may have a larger propagation delay than in a terrestrial network. In some aspects, a scheduling time offset (K_offset) may be used to compensate for the propagation delay in an NTN.

K_offset may be applied to enhance the timing relationship between scheduling and transmission of various uplink communications. As shown in FIG. 6, K_offset may be applied to enhance a physical downlink control channel (PDCCH)-to-physical uplink shared channel (PUSCH) timing in an NTN. The PDCCH-to-PUSCH timing (which may be referred to as a "K2") is a time offset between the transmission of a PDCCH communication that schedules a PUSCH communication, and reception of the scheduled PUSCH communication. In some aspects, K_offset may be added to K2 to extend the offset between the PDCCH and the PUSCH in order to compensate for propagation delay in the NTN. As shown by reference number 605, a base station in the NTN may transmit a PDCCH to a UE (e.g., via a satellite) at slot n, and the UE may receive the PDCCH transmitted by the base station at slot n. The PDCCH communication may schedule a PUSCH communication for the UE (e.g., by indicating the K2 value). As shown by reference number 610, the UE may transmit the PUSCH communication at an offset of K_offset+K2 from slot n with a negative offset for the round trip delay (RTD) between the UE and the base station (e.g., the UE may transmit the PUSCH communication at n+K_offset+K2−RTD), such that the base station may receive the PUSCH communication at an offset of K_offset+K2 from slot n (e.g., at n+K_offset+K2). K_offset may be set by the base station. In some examples, K_offset may be cell-specific, UE-specific, or beam-specific (e.g., a respective K_offset value may be configured for each beam from a same satellite and/or in a same non-terrestrial cell). In some aspects, the cell-specific K_offset value for a non-terrestrial cell may be calculated based at least in part on the distance of the feeder link between the base station or gateway and the satellite, and on the largest possible distance from a UE in the cell to the satellite. A reference point may be defined between a satellite and a base station, where the uplink time frame and the downlink time frame are aligned. The round-trip time between the reference point and the base station, called $K_{mac}$, may be used to calculate the UE and base station round trip time (RTT), e.g., UE-gNB RTT, which may be equal to a timing advance (TA) plus the delay represented by $K_{mac}$.

In some examples, a UE may apply a TA to uplink transmissions in an NTN. The TA may be a negative timing offset that is used by the UE for uplink transmissions to pre-compensate for the propagation delay in the NTN and synchronize the uplink transmissions with the timing of the base station. The total TA ($T_{TA}$) applied by an NR NTN UE in an RRC idle/inactive mode or in an RRC connected mode may be calculated as:

$$T_{TA} = (N_{TA} + N_{TA,UE\text{-}specific} + N_{TA,common} N_{TA,offset}) \times T_c.$$

$N_{TA}$ is a TA value indicated in a TA command from the base station. $N_{TA}$ may be defined as 0 for a PRACH transmission and updated in a TA command field in message 2 (Msg2) or message B (MsgB) (e.g., a random access response message) in a RACH procedure and/or in a MAC control element (MAC-CE) TA command. $N_{TA,UE\text{-}specific}$ is a UE-specific TA, which is self-estimated by the UE to pre-compensate for the service link delay between the UE and the satellite. $N_{TA,common}$ is a common TA, which is a network controlled TA value that is common to all UEs in a non-terrestrial cell and may include any timing offset determined to be necessary by the network. In some examples, the common TA ($N_{TA,common}$) may be determined (e.g., by the base station or another network device) to pre-compensate for the feeder link delay between the satellite and the base station or gateway. In some examples, ($N_{TA,UE\text{-}specific}$) with a value of 0 may be supported (e.g., for a non-terrestrial base station, such as satellite 520 in FIG. 5). $N_{TA}$,offset may be a fixed offset value associated with a frequency band and/or subcarrier spacing. $T_c$ is a time unit (e.g., $T_c=1/(480000\times 4096))$ seconds.

In some examples, a UE in an NTN may perform synchronization by calculating the total TA based at least in part on synchronization parameters received from the base station. For example, the synchronization parameters may include an indication of an ephemeris of the satellite and an indication of the common TA. The indication of the ephemeris of the satellite may include trajectory data associated with the satellite, such as position and velocity of the satellite as a function of time. In some examples, the UE may calculate the UE-specific TA ($N_{TA, UE\text{-}specific}$) based at least in part on the ephemeris of the satellite and calculate the total TA advance using the UE-specific TA ($N_{TA, UE\text{-}specific}$) and the common TA ($N_{TA,common}$). The UE may also determine frequency pre-compensation for uplink transmissions based at least in part on the ephemeris of the satellite. In some examples, the base station may transmit an indication of the synchronization parameters (e.g., the ephemeris and the common TA), as well as the scheduling timing offset (e.g., K_offset) and the RTT between the reference point and the base station (e.g., $K_{mac}$) in a system information block (SIB). For example, the base station may transmit the SIB with a certain frequency (e.g., on the order of once per few seconds).

As indicated above, FIG. 6 is provided as an example. Other examples may differ from what is described with respect to FIG. 6.

As used herein, "non-terrestrial cell" may refer to a cell associated with a non-terrestrial base station (e.g., satellite 520 in FIG. 5) and/or a cell in which coverage is provided by a non-terrestrial relay (e.g., satellite 540 in FIG. 5) between the base station and one or more UEs. A handover may be performed in which a UE switches a serving cell from one non-terrestrial cell to another non-terrestrial cell. In some examples, the handover may be from a source non-terrestrial cell associated with one satellite to a target non-terrestrial cell associated with another satellite (e.g., due to movement of the UE and/or the satellites). In some examples, the handover may be from a source non-terrestrial cell to a target non-terrestrial cell with the same satellite (e.g., due to switching feeder links based at least in part on the movement of the satellite). In such handovers in an NTN, the UE may not receive the synchronization parameters and the scheduling timing offset value associated with the target non-terrestrial cell prior to the handover. In this case, the UE may need to monitor for and decode a transmission, from the target base station, of the SIB including the synchronization parameters and the scheduling timing offset value in order to perform the RACH procedure to establish an RRC connection with the target base station, which may lead to increased latency and UE power consumption.

In some aspects, the source base station may forward the synchronization parameters, the scheduling timing offset value and the RTT between the reference point and the base station for the target non-terrestrial cell to the UE, for example, in the handover command. This may reduce latency and UE power consumption associated with the handover. However, in the case of a conditional handover, some time may pass between a time at which the conditional handover is configured and a time at which the conditional handover is triggered. The synchronization parameters (e.g., the ephemeris of the satellite and the common TA) are time dependent, and may change between the time at which the conditional handover is configured and the time at which the conditional handover is triggered. In this case, the UE may apply outdated synchronization parameters when attempting to establish an RRC connection with a candidate target base station. As a result, the UE may fail to establish the RRC connection and complete the handover with the candidate target base station, which may cause increased latency and power consumption for the UE.

Some techniques and apparatuses described herein enable a source base station to transmit, to a UE, configuration information for a handover. The configuration information may indicate, for each of one or more candidate target non-terrestrial cells, timing and synchronization parameters including a scheduling timing offset, a round trip time between a reference point and a base station associated with the candidate target non-terrestrial cell, satellite ephemeris information, and ephemeris validity duration associated with the satellite ephemeris information, common TA parameters, and a common TA validity duration. The UE may perform the handover with a target base station associated with a candidate target non-terrestrial cell based at least in part on the timing and synchronization parameters for the candidate target non-terrestrial cell. As a result, the UE may apply the satellite ephemeris information (e.g., for calculating the TA) for the candidate target terrestrial cell only during the ephemeris validity duration, and the UE may apply the common TA information (e.g., for calculating the TA) for the candidate target terrestrial cell only during the common TA validity duration. In this way, the UE may avoid attempting to connect with the target base station using outdated synchronization parameters, which may increase reliability and decrease latency and UE power consumption for handovers in an NTN.

Figure 7:
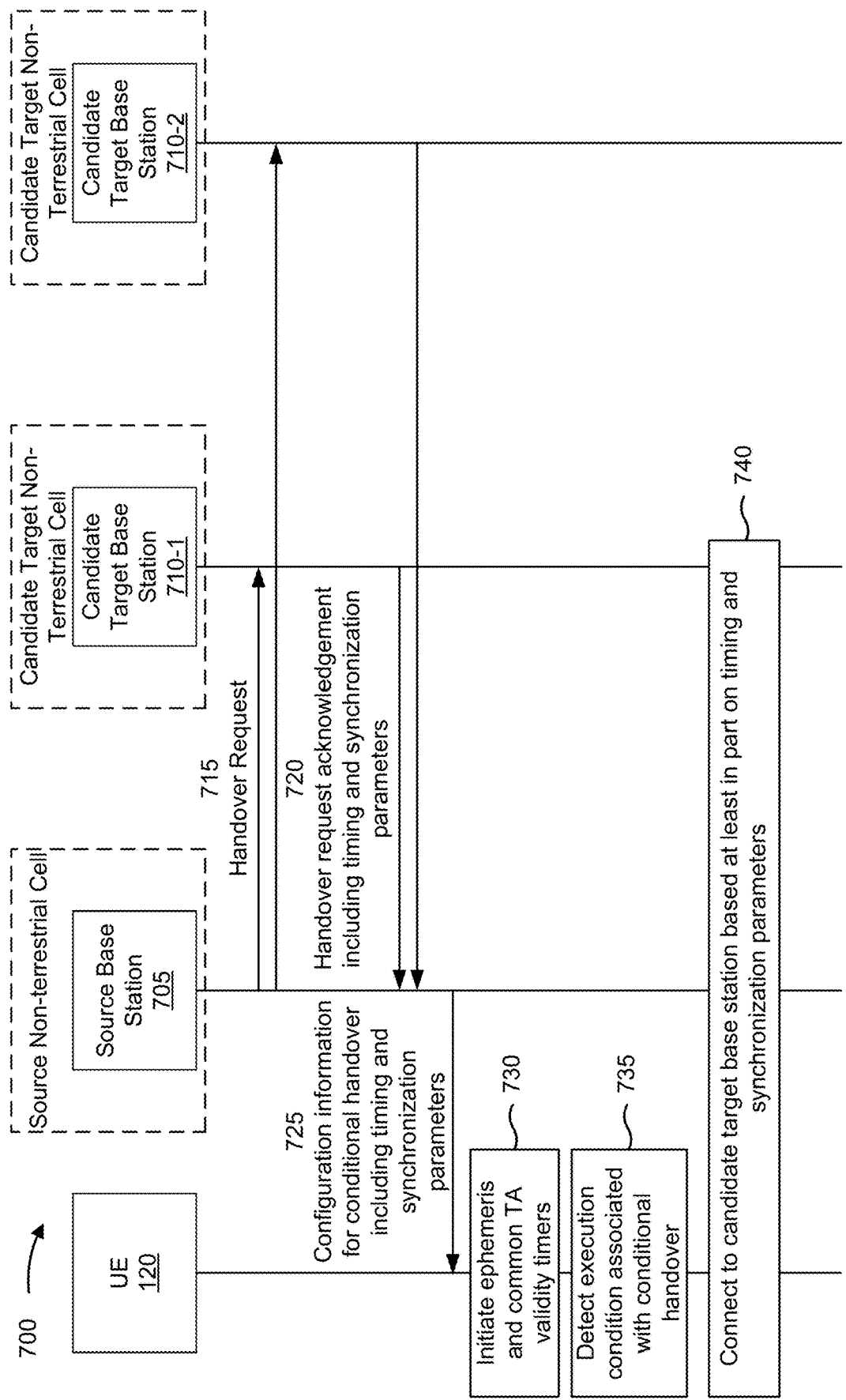
FIG. 7 is a diagram illustrating an example associated with signaling of timing and synchronization parameters for a handover in an NTN, in accordance with the present disclosure.

FIG. 7 is a diagram illustrating an example 700 associated with signaling of timing and synchronization parameters for a handover in an NTN, in accordance with the present disclosure. As shown in FIG. 7, the UE 120 may communicate (for example, transmit an uplink transmission or receive a downlink transmission) with a source base station 705 (for example, a base station 110), a first candidate target base station 710-1 (for example, a base station 110), and/or a second candidate target base station 710-2 (for example, a base station 110). The UE 120, the source base station 705, the first candidate target base station 710-1, and/or the second candidate target base station 710-2 may be part of a wireless network (such as the wireless network 100). In some aspects, the UE 120, the source base station 705, the first candidate target base station 710-1, and/or the second candidate target base station 710-2 may be part of an NTN.

The source base station 705 may be associated with a non-terrestrial cell (e.g., a source non-terrestrial cell). In some aspects, the source base station 705 may communicate with the UE 120 via a satellite (e.g., satellite 540 of FIG. 5)

that relays communications between the source base station 705 and the UE 120. For example, the source base station 705 may transmit downlink communications on a feeder link to the satellite, and the UE 120 may receive the downlink communications on a service link from the satellite. The UE 120 may transmit uplink communications on the service link to the satellite, and the source base station 705 may receive the uplink communications on the feeder link from the satellite. In some aspects, the source base station 705 may be a non-terrestrial base station. For example, the source base station 705 may be or may be included in a satellite (e.g., satellite 520 of FIG. 5).

The first candidate target base station 710-1 may be associated with a non-terrestrial cell (e.g., a first candidate target non-terrestrial cell). In some aspects, the first candidate target base station 710-1 may communicate with the UE 120 via a satellite (e.g., satellite 540 of FIG. 5) that relays communications between the first candidate target base station 710-1 and the UE 120. For example, the first candidate target base station 710-1 may transmit downlink communications on a feeder link to the satellite, and the UE 120 may receive the downlink communications on a service link from the satellite. The UE 120 may transmit uplink communications on the service link to the satellite, and the first candidate target base station 710-1 may receive the uplink communications on the feeder link from the satellite. In some aspects, the first candidate target base station 710-1 may be a non-terrestrial base station. For example, the first candidate target base station 710-1 may be or may be included in a satellite (e.g., satellite 520 of FIG. 5).

The second candidate target base station 710-2 may be associated with a non-terrestrial cell (e.g., a second candidate target non-terrestrial cell). In some aspects, the second candidate target base station 710-2 may communicate with the UE 120 via a satellite (e.g., satellite 540 of FIG. 5) that relays communications between the second candidate target base station 710-2 and the UE 120. For example, the second candidate target base station 710-2 may transmit downlink communications on a feeder link to the satellite, and the UE 120 may receive the downlink communications on a service link from the satellite. The UE 120 may transmit uplink communications on the service link to the satellite, and the second candidate target base station 710-2 may receive the uplink communications on the feeder link from the satellite. In some aspects, the second candidate target base station 710-2 may be a non-terrestrial base station. For example, the second candidate target base station 710-2 may be or may be included in a satellite (e.g., satellite 520 of FIG. 5).

The source non-terrestrial cell, associated with the source base station 705, may be a serving cell for the UE 120. For example, the UE 120 may have an established connection (such as an RRC connection in an active or connected state) with the source base station 705. The first candidate base station 710-1 and the second candidate base station 710-2 (collectively, candidate target base stations 710) may be candidate target base stations associated with candidate target non-terrestrial cells (e.g., the first second candidate target non-terrestrial cell and the second candidate target non-terrestrial cell, respectively) for a handover procedure (such as a conditional handover procedure).

As shown in FIG. 7, and by reference number 715, the source base station 705 may transmit, to the candidate target base stations 710, a handover request message. In some aspects, the source base station 705 may transmit a respective handover request message to each of the candidate target base stations 710 (e.g., the first candidate target base station 710-1 and the second candidate target base station 710-2). The handover request message may indicate that a candidate target base station 710, or candidate target non-terrestrial cell, is to be configured (for example, at the UE 120) as part of a conditional handover configuration. For example, the handover request message may indicate a request for the candidate base station 710 to provide cell configuration information associated with the candidate base station for the conditional handover configuration.

In some aspects, the handover request message may indicate a request for the candidate target base station 710 to provide a set of timing and synchronization parameters relating to the candidate target non-terrestrial cell associated with the candidate target base station 710. For example, the set of timing and synchronization parameters may include NTN-specific timing and synchronization parameters associated with the candidate target non-terrestrial cell. In some aspects, the requested set of timing and synchronization parameters may include a cell specific scheduling timing offset (K_offset), a RTT between a reference point and the candidate target base station ($K_{mac}$), a satellite ephemeris, an ephemeris validity duration, common TA parameters, and a common TA validity duration for the candidate target non-terrestrial cell. Additionally, or alternatively, the requested set of timing and synchronization parameters may include a target cell stop time and/or target cell beam information, such as a reference location, beam center or radius, and/or a signal strength threshold for detecting an edge of the candidate target non-terrestrial cell. In some aspects, the requested set of timing and synchronization parameters may include frequency offset parameters (e.g., for downlink and/or uplink transmissions).

Although FIG. 7 shows two candidate target base stations 710, the source base station 705 may transmit the handover request message to more candidate target base stations or fewer candidate target base stations.

As further shown in FIG. 7, and by reference number 720, each of the candidate target base stations 710 may transmit, to the source base station 705, a respective handover request acknowledgement that includes timing and synchronization parameters for the respective candidate target non-terrestrial cell.

In some aspects, the timing and synchronization parameters included with the handover request acknowledgment transmitted from a candidate target base station 710 may include a cell-specific scheduling timing offset (K_offset) for the candidate target non-terrestrial cell. The scheduling timing offset (K_offset) may be a cell-specific timing offset for scheduling uplink communications to be transmitted (e.g., via satellite) in the candidate target non-terrestrial cell. For example, the candidate target base station 710 may calculate the cell-specific scheduling timing offset (K_offset) based at least in part on the distance of a feeder link (e.g., between the candidate target base station 710 and the satellite) and the largest possible distance from a UE to the satellite in the candidate target non-terrestrial cell. In some aspects, the timing and synchronization parameters included with the handover request acknowledgment transmitted from a candidate target base station 710 may include a RTT between a reference point of the candidate target non-terrestrial cell and the candidate target base station ($K_{mac}$) of the candidate target non-terrestrial cell.

In some aspects, the timing and synchronization parameters may include satellite ephemeris information for the satellite associated with the candidate target non-terrestrial cell and an ephemeris validity duration associated with the satellite ephemeris information. For example, the satellite ephemeris information may include an indication of a satellite ephemeris in a position-velocity-time (PVT) format or in a Keplerian format (which may be also called orbital format). The ephemeris validity duration may be a time duration for which the satellite ephemeris information is valid. In some aspects, the timing and synchronization parameters may also include an indication of a reference time from which the ephemeris validity duration begins. In some aspects, the reference time may be also called epoch time. In some aspects, based at least in part on receiving the handover request message from the source base station 705, the candidate target base station 710 may determine the satellite ephemeris for the candidate target non-terrestrial cell and the ephemeris validity duration associated with the satellite ephemeris.

In some aspects, the timing and synchronization parameters may include common TA parameters for the candidate target non-terrestrial cell and a common TA validity duration associated with the common TA parameters. The common TA parameters may include an indication of the common TA ($N_{TA,common}$) and derivatives of one or more orders of the common TA. The common TA validity duration may be a time duration for which the common TA parameters are valid. In some aspects, the timing and synchronization parameters may also include an indication of a reference time from which the common TA validity duration begins. In some aspects, the reference time may be also called epoch time. In some aspects, based at least in part on receiving the handover request message from the source base station 705, the candidate target base station 710 may determine the common TA parameters for the candidate target non-terrestrial cell and the common TA validity duration associated with the common TA parameters.

In some aspects, the timing and synchronization parameters may include a target cell stop time and/or target cell beam information for detecting a cell edge of the candidate target non-terrestrial cell. The target cell stop time may be an indication of a time at which the candidate target non-terrestrial cell will no longer provide coverage to a coverage area in which the UE 120 is located (e.g., due to movement of the satellite). The target cell beam information may include or be associated with at least one of a reference location, a beam center, a beam radius, or a signal strength threshold (e.g., RSRP threshold) for detecting a cell edge of the candidate target non-terrestrial cell.

In some aspects, the timing and synchronization parameters may include at least one of a downlink frequency offset or an uplink frequency offset associated with the candidate target non-terrestrial cell. The downlink frequency offset may include an indication of a frequency pre-compensation for a downlink transmission. In some aspects, the timing and synchronization parameters may also include a reference location associated with the frequency pre-compensation for the downlink transmission, such as a location for a beam center of a beam identified by a synchronization signal block (SSB) or channel state information reference signal (CSI-RS) resource indicator (CRI). The uplink frequency offset may include an indication of a frequency offset to be applied by the UE 120 for an uplink transmission. For example, the uplink frequency offset may compensate for Doppler frequency shift of the feeder link between the candidate target base station 710 and the satellite in the candidate target non-terrestrial cell.

As further shown in FIG. 7, and by reference number 725, the source base station 705 may transmit, to the UE 120, a handover command including configuration information for a conditional handover. The configuration information included in the handover command may indicate the timing and synchronization parameters for each of the candidate target non-terrestrial cells.

In some aspects, the timing and synchronization parameters may include a respective cell-specific scheduling timing offset (K_offset) for each candidate target non-terrestrial cell. The scheduling timing offset (K_offset) may be a cell-specific timing offset for scheduling uplink communications to be transmitted (e.g., via satellite) in the candidate target non-terrestrial cell. In some aspects, the timing and synchronization parameters may include a RTT between a reference point and the candidate target base station ($K_{mac}$) for each candidate target non-terrestrial cell. The RTT ($K_{mac}$) may be used to compute the UE to base station RTT, which may be used to determine the value of some timers for the communication.

In some aspects, the timing and synchronization parameters may include respective satellite ephemeris information and a respective ephemeris validity duration for each candidate target non-terrestrial cell. For example, the satellite ephemeris information, for a candidate target non-terrestrial cell, may include an indication of the satellite ephemeris in the PVT format or in the Keplerian format. The ephemeris validity duration may be a time duration for which the satellite ephemeris information is valid. In some aspects, the ephemeris validity duration, for a candidate target non-terrestrial cell, may include a single ephemeris validity duration value to be applied by the UE 120 for all uplink transmissions during a handover, including a PRACH transmission and one or more other uplink communications in a RACH procedure (e.g., message 3 (Msg3), message 5 (Msg5), and/or message B (MsgB)). In some aspects, the ephemeris validity duration included in the configuration information may include an indication of a first ephemeris validity duration value to be applied to a PRACH communication (e.g., to initiate the RACH procedure) and an indication of a second ephemeris validity duration value to be applied to communications on other uplink channels (e.g., PUSCH and/or physical uplink control channel (PUCCH) communications). In this case, the first ephemeris validity duration value to be applied to the PRACH communication may be longer than the second ephemeris validity duration value (e.g., for the PUSCH and/or PUCCH communications) (e.g., due to relaxation of initial timing requirements on PRACH as compared to other uplink transmissions). In some aspects, the timing and synchronization parameters may also include an indication of a reference time from which the indicated ephemeris validity duration begins.

In some aspects, the timing and synchronization parameters may include respective common TA parameters and a respective common TA validity duration for each candidate target non-terrestrial cell. The common TA parameters, for a candidate target non-terrestrial cell, may include an indication of the common TA ($N_{TA,common}$) and derivatives of one or more orders of the common TA. For example, the UE 120 may predict the common TA during the common TA validity duration using a Taylor expansion based at least in part on the derivatives of the common TA indicated in the common TA parameters. The common TA validity duration may be a time duration for which the common TA parameters are valid. In some aspects, the common TA validity duration, for a candidate target non-terrestrial cell, may include a single common TA validity duration value to be applied by the UE 120 for all uplink transmissions during a handover, including a PRACH transmission and one or more other uplink communications in a RACH procedure (e.g., Msg3, Msg5, and/or MsgB). In some aspects, the common TA validity duration included in the configuration information may include an indication of a first common TA validity duration value to be applied to a PRACH communication (e.g., to initiate the RACH procedure) and an indication of a second common TA validity duration value to be applied to communications on other uplink channels (e.g., PUSCH and/or PUCCH communications). In this case, the first common TA validity duration value to be applied to the PRACH communication may be longer than the second common TA validity duration value (e.g., for the PUSCH and/or PUCCH communications) (e.g., due to relaxation of initial timing requirements on PRACH as compared to other uplink transmissions). In some aspects, the timing and synchronization parameters may also include an indication of a reference time from which the common TA validity duration begins.

In some aspects, the timing and synchronization parameters may include at least one of a respective target cell stop time or respective target cell beam information for detecting a cell edge for each candidate target non-terrestrial cell. The target cell stop time may be an indication of a time at which the candidate target non-terrestrial cell will no longer provide coverage to a coverage area in which the UE 120 is located (e.g., due to movement of the satellite). The target cell beam information may include or be associated with at least one of a reference location, a beam center, a beam radius, or a signal strength threshold for detecting a cell edge of the candidate target non-terrestrial cell.

In some aspects, the timing and synchronization parameters may include at least one of a respective downlink frequency offset or a respective uplink frequency offset for each candidate target non-terrestrial cell. The downlink frequency offset may include an indication of a frequency pre-compensation for a downlink transmission. In some aspects, the timing and synchronization parameters may also indicate a reference location associated with the downlink frequency offset, such as a location for a beam center of a beam identified by an SSB or a CRI, which may increase the speed of the UE 120 finding a target synchronization signal, such as the SSB, when connecting to the candidate target non-terrestrial cell. The uplink frequency offset may include an indication of a frequency offset to be applied by the UE 120 for an uplink transmission. For example, the uplink frequency offset may compensate for Doppler frequency shift of the feeder link between the candidate target base station 710 and the satellite in the candidate target non-terrestrial cell, which can help to reduce a burden on the candidate target base station 710 in handling the feeder link Doppler frequency shift.

In some aspects, the configuration information included in the handover command may include, for at least one candidate target non-terrestrial cell, an indication for the UE 120 to use the same timing and synchronization parameters (e.g., K_offset, $K_{mac}$, the satellite ephemeris, the common TA, and/or the downlink/uplink frequency offsets) as for current timing and synchronization parameters associated with the source base station 705. For example, a bit in the handover command may be defined to indicate to use the same parameters as the source base station 705 for a candidate target non-terrestrial cell. In this case, the configuration information associated with that candidate target non-terrestrial cell may not signal the individual timing and synchronization parameters for that candidate target non-terrestrial cell. For example, the handover command may indicate for the UE 120 to use the same timing and synchronization parameters as in the source base station 705 in a case in which the satellite is the same for the source non-terrestrial cell and for the candidate target non-terrestrial cell (and/or in a case in which the base station and/or the gateway are the same).

In some aspects, the source base station 705 may transmit the configuration information to the UE 120 in one or more RRC reconfiguration messages. For example, the source base station 705 may transmit, to the UE 120, a container including respective RRC configuration information forwarded from each of the candidate target base stations 710. In some aspects, an information element (e.g., ReconfigurationWithSync or SpCellConfig) that is used for non-NTN handover configuration information in the RRC reconfiguration message may be extended to also include the configuration information that indicates the timing and synchronization parameters (e.g., the parameters associated with the NTN) for a candidate target non-terrestrial cell. In some aspects, the timing and synchronization parameters (e.g., the parameters associated with the NTN) for a candidate target non-terrestrial cell may be included in the RRC reconfiguration message but not in the information element (e.g., ReconfigurationWithSync or SpCellConfig) in which the non-NTN handover configuration information is included. For example, the RRC reconfiguration message (RRCReconfiguration) with ReconfigurationWithSync may be extended to include dedicatedNTN-SIB-Delivery, which may be an octet string including the NTN-SIB information (e.g., the timing and synchronization parameters associated with NTN).

In some aspects, the configuration information may include one or more execution conditions associated with the conditional handover. "Execution condition" may refer to one or more conditions that, when met or satisfied, trigger a handover procedure to a given candidate target base station associated with the conditional handover procedure. The source base station 705 may determine the one or more execution conditions. In some aspects, an execution condition may be associated with a measurement of a signal transmitted by a candidate target base station or a candidate cell. For example, if a measurement value (for example, an RSRP measurement value or an RSRQ measurement value) of the signal transmitted by the candidate base station or the candidate cell satisfies a threshold indicated by the execution condition, or is greater than a measurement value of a signal transmitted by the source base station 705 by a threshold amount that is indicated by the execution condition, then the execution condition may be met or satisfied. In some aspects, for a conditional handover in an NTN, an execution condition may be associated with a target cell stop time for a candidate target non-terrestrial cell or a distance between a location of the UE 120 and a cell edge of a candidate target non-terrestrial cell.

Although FIG. 7 shows a conditional handover configuration, in some aspects, the handover command (e.g., RRC reconfiguration message) may be for a handover procedure that is not conditional. In this case, the configuration information may include the timing and synchronization parameters described above, other than the validity durations (e.g., the ephemeris validity duration and the common TA validity duration).

As further shown in FIG. 7, and by reference number 730, the UE 120 may initiate a respective ephemeris validity timer and a respective common TA validity timer for each of the candidate target non-terrestrial cells. In some aspects, for each of the one or more candidate target non-terrestrial cells, the UE 120 may initiate the respective ephemeris validity timer based at least in part on receiving the configuration information that indicates the ephemeris information and the ephemeris validity duration for that candidate target non-terrestrial cell. In some aspects, for each of the one or more candidate target non-terrestrial cells, the UE 120 may initiate the respective common TA validity timer based at least in part on receiving the configuration information that indicates the common TA parameters and the common TA validity timer for that candidate target non-terrestrial cell.

The UE 120 may receive the handover command from the source base station 705 at a downlink time slot N. However, the downlink time slot may be different between the UE 120, the source base station 705, and a candidate target non-terrestrial cell. In some aspects, a reference time associated with the ephemeris information may be indicated by the candidate target base station 710 associated with a candidate target non-terrestrial cell, because the candidate target base station 710 may not know when the source base station 705 will deliver the handover command to the UE 120. For example, there may be a delay between the candidate target base station 710 sending the confirmation information to the source base station 705 and the source base station 705 sending the confirmation information to the UE 120. In some aspects, the reference time associated with the ephemeris may be explicitly indicated in the handover command (e.g., in the configuration information in the handover command). In some aspects, the reference time associated with the ephemeris may be at a time offset from the downlink slot N in which the handover command is received by an RRC processing time (e.g., N+RRC processing time). In some aspects, the reference time associated with the ephemeris may be at a time offset from the downlink slot N in which the handover command is received by a round trip time (UE-gNB-RTT) associated with the UE and the source base station (e.g., N+UE-gNB-RTT).

The ephemeris validity duration may begin at the reference time associated with the ephemeris. For example, the UE 120 may initiate the ephemeris validity timer at the reference time associated with the ephemeris, and the ephemeris validity timer may run for the ephemeris validity duration. In some aspects, the UE 120 may apply the ephemeris information for a candidate target non-terrestrial cell for uplink communications for a handover (e.g., in a RACH procedure) until the ephemeris validity time expires.

In some aspects, a reference time associated with the common TA parameters may be indicated by the candidate target base station 710 associated with a candidate target non-terrestrial cell. In some aspects, the reference time associated with the common TA parameters may be explicitly indicated in the handover command (e.g., in the configuration information in the handover command). In some aspects, the reference time associated with the common TA parameters may be at a time offset from the downlink slot N in which the handover command is received by an RRC processing time (e.g., N+RRC processing time). In some aspects, the reference time associated with the common TA parameters may be at a time offset from the downlink slot N in which the handover command is received by a round trip time (UE-gNB-RTT) associated with the UE and the source base station (e.g., N+UE-gNB-RTT).

The common TA validity duration may begin at the reference time associated with the common TA parameters. For example, the UE 120 may initiate the common TA validity timer at the reference time associated with the common TA parameters, and the common TA validity timer may run for the common TA validity duration. The UE 120 may apply the common TA parameters for a candidate target non-terrestrial cell for uplink communications for a handover (e.g., in a RACH procedure) until the common TA validity time expires.

As further shown in FIG. 7, and by reference number 735, the UE 120 may detect an execution condition associated with the conditional handover. The UE 120 may detect that an execution condition associated with the conditional handover procedure is satisfied or met. For example, the UE 120 may detect that an execution condition (from the one or more execution conditions configured by the source base station 705 and described in more detail elsewhere herein) is satisfied or met. The UE 120 may select a target base station for the handover based at least in part on detecting the execution condition. For example, based at least in part on detecting the execution condition, the UE 120 may be triggered to perform the handover with the first candidate target base station 710-1.

As further shown in FIG. 7, and by reference number 740, the UE 120 may connect to the first candidate target base station 710-1 based at least in part on the timing and synchronization parameters for the candidate target non-terrestrial cell associated with the first candidate target base station 710-1. The UE 120 may transmit a PRACH communication to the first candidate target base station 710-1 to initiate a RACH procedure for establishing an RRC connection with the first candidate target base station 710-1. In some aspects, the UE 120 may determine a TA to apply to the PRACH communication based at least in part on the timing and synchronization parameters for the candidate target non-terrestrial cell associated with the first candidate target base station 710-1.

The UE 120 may determine whether the ephemeris information and the common TA parameters for the candidate target non-terrestrial cell are valid based at least in part on the ephemeris validity duration and the common TA validity duration, respectively. In some aspects, the UE 120 may initiate a synchronization timer (e.g., uplink synchronization timer) based at least in part on the ephemeris validity duration and/or the common TA validity duration. For example, the synchronization timer, once started, may run as long as both the ephemeris validity timer and the common TA validity timer are running. Alternatively, the synchronization timer may run as long as either of the ephemeris validity timer or the common TA validity timer is running. In some aspects, the synchronization timer may be initiated (e.g., started) at the reference time associated with the ephemeris or at the reference time associated with the common TA parameters. In some aspects, the synchronization timer may be initiated at a downlink RACH occasion slot X associated with a PRACH preamble transmission for the candidate target non-terrestrial cell. For example, the RACH occasion may be a dedicated RACH occasion or a non-dedicated RACH occasion, and the PRACH transmission may be Msg1 or part of MsgA. In this case, when the handover is complete, the UE 120 may indicate, in the handover complete message (e.g., the RRC reconfiguration complete message), how many attempts of PRACH transmissions were made to connect to the first candidate target base station 710-1 and/or when the timers were started.

In some aspects, UE 120 may determine whether the ephemeris information and the common TA parameters for the candidate target non-terrestrial cell are valid based at least in part on whether the synchronization timer (e.g., and/or the ephemeris validity timer and the common TA timer) has expired. Based at least in part on a determination that the ephemeris information and the common TA parameters for the candidate target non-terrestrial cell are valid (e.g., the synchronization timer has not expired), the UE 120 may calculate the TA for the PRACH transmission (and/or one or more other uplink transmissions in the RACH procedure) based at least in part on the ephemeris information and the common TA parameters indicated in the handover command. For example, the UE 120 may calculate the UE-specific TA ($N_{TA,UE\text{-}specific}$) based at least in part on the ephemeris information. The UE 120 may determine the common TA (e.g., $N_{TA,common}$) using the common TA parameters. The UE 120 may determine the total TA to apply to the PRACH transmission (and/or other uplink transmissions) based at least in part on $N_{TA,UE\text{-}specific}$ and $N_{TA,common}$. In some aspects, the UE 120 may apply the scheduling timing offset (K_offset) when transmitting one or more uplink communications (e.g., Msg3, Msg5, and/or Msg B) after the PRACH transmission in the RACH procedure. In some aspects, the UE 120 may apply the downlink frequency offset when receiving downlink communications in the RACH procedure, and/or the UE 120 may apply the uplink frequency offset when transmitting uplink communications in the RACH procedure.

In some aspects, the UE 120 may establish an RRC connection with the first candidate target base station 710-1 via the RACH procedure. The UE 120 may then transmit an RRC reconfiguration complete message (e.g., a handover complete message) to the first candidate target base station 710-1. The RRC reconfiguration complete message may indicate that the UE 120 has changed an RRC connection from the source base station 705 to the first candidate target base station 710-1. The first candidate target base station 710-1 may transmit a handover success message (for example, indicating successful handover of the UE 120) to the source base station 705. In some aspects, the source base station 705 may transmit a handover cancel message to the second candidate target base station 710-2. The source base station 705 and the first candidate target base station 710-1 may perform a UE context release procedure to release the UE 120 context at the source base station 705.

As indicated above, FIG. 7 is provided as an example. Other examples may differ from what is described with respect to FIG. 7.

Figure 8:
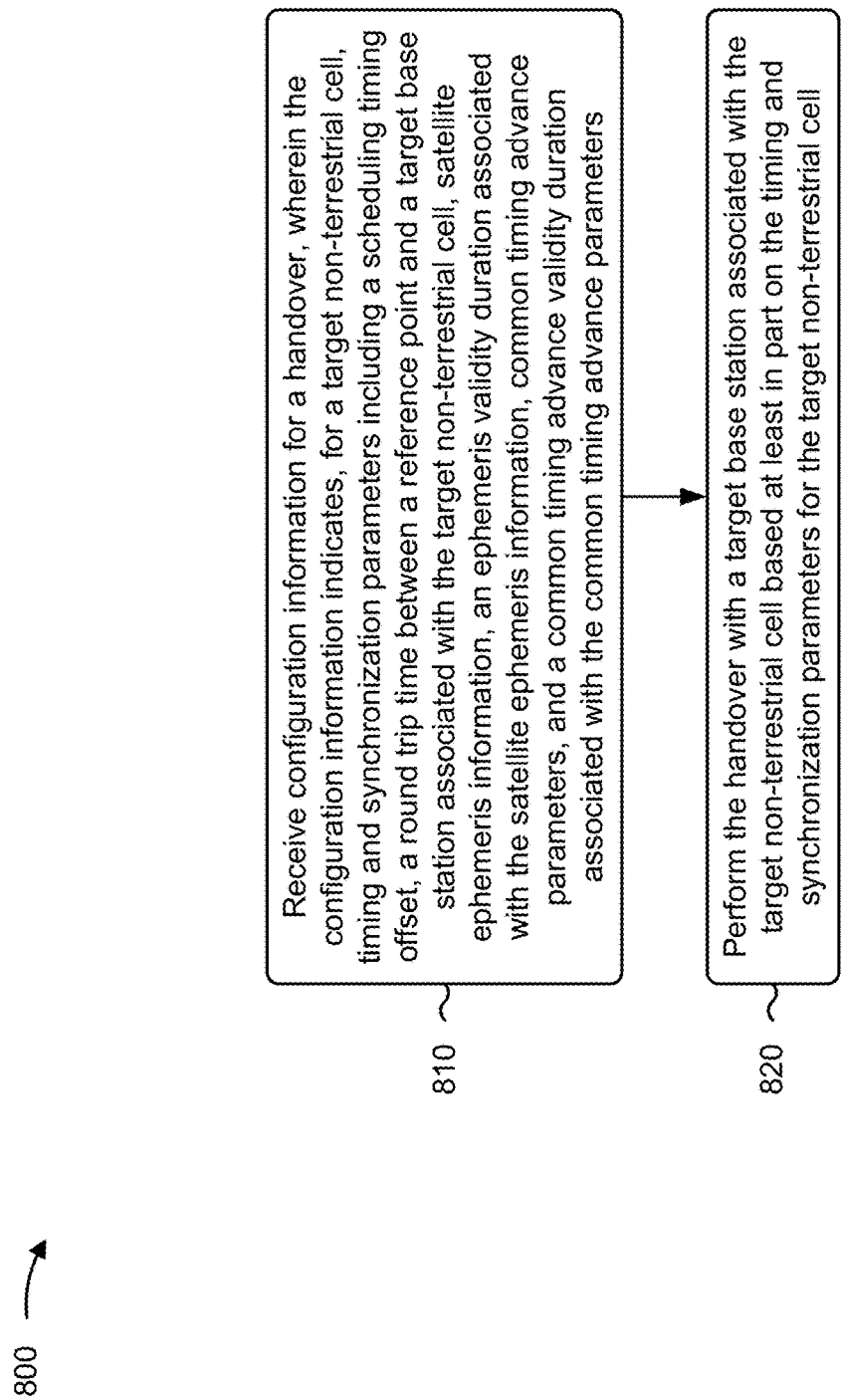
FIGS. 8-9 are diagrams illustrating example processes associated with signaling of timing and synchronization parameters for a handover in an NTN, in accordance with the present disclosure.

FIG. 8 is a diagram illustrating an example process 800 performed, for example, by a UE, in accordance with the present disclosure. Example process 800 is an example where the UE (e.g., UE 120) performs operations associated with signaling of timing and synchronization parameters for handover in non-terrestrial network.

As shown in FIG. 8, in some aspects, process 800 may include receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters (block 810). For example, the UE (e.g., using communication manager 140 and/or reception component 1002, depicted in FIG. 10) may receive, from a source base station, configuration information for a handover, wherein the configuration information indicates, for a candidate target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters, as described above.

As further shown in FIG. 8, in some aspects, process 800 may include performing the handover with the target base station associated with the target non-terrestrial cell based at least in part on the timing and synchronization parameters for the target non-terrestrial cell (block 820). For example, the UE (e.g., using communication manager 140 and/or handover component 1008, depicted in FIG. 10) may perform the handover with the target base station associated with the target non-terrestrial cell based at least in part on the timing and synchronization parameters for the target non-terrestrial cell, as described above.

Process 800 may include additional aspects, such as any single aspect or any combination of aspects described below and/or in connection with one or more other processes described elsewhere herein.

In a first aspect, the scheduling timing offset is a cell-specific timing offset for scheduling uplink communications to be transmitted via a satellite to the target base station associated with the target non-terrestrial cell.

In a second aspect, alone or in combination with the first aspect, the satellite ephemeris information includes an indication of a satellite ephemeris in at least one of a position-velocity-time format or a Keplerian format.

In a third aspect, alone or in combination with one or more of the first and second aspects, the common timing advance parameters include an indication of a common timing advance and derivatives of one or more orders of the common timing advance.

In a fourth aspect, alone or in combination with one or more of the first through third aspects, the timing and synchronization parameters further include at least one of a target cell stop time or target cell beam information associated with the target non-terrestrial cell.

In a fifth aspect, alone or in combination with one or more of the first through fourth aspects, the at least one of the target cell stop time or the target cell beam information is associated with at least one of a reference location, a beam center, a beam radius, or a signal strength threshold for detecting a cell edge of the target non-terrestrial cell.

In a sixth aspect, alone or in combination with one or more of the first through fifth aspects, the configuration information indicates the timing and synchronization parameters for each of one or more candidate target non-terrestrial cells, and the target non-terrestrial cell is a candidate target non-terrestrial cell of the one or more candidate target non-terrestrial cells.

In a seventh aspect, alone or in combination with one or more of the first through sixth aspects, the configuration information includes, for at least one candidate target non-terrestrial cell of the one or more candidate target non-terrestrial cells, an indication for the UE to use same timing and synchronization parameters for the at least one candidate target non-terrestrial cell as current timing and synchronization parameters associated with the source base station.

In an eighth aspect, alone or in combination with one or more of the first through seventh aspects, the handover is a conditional handover, the configuration information is included in a handover command that further includes an execution condition, and performing the handover with the target base station associated with the target non-terrestrial cell comprises transmitting, based at least in part on the timing and synchronization parameters for the candidate target non-terrestrial cell, a message to initiate the conditional handover with the target base station in connection with a determination that the execution condition is satisfied.

In a ninth aspect, alone or in combination with one or more of the first through eighth aspects, transmitting the message comprises transmitting a physical random access channel communication to initiate a random access channel procedure to connect with the target base station.

In a tenth aspect, alone or in combination with one or more of the first through ninth aspects, for the candidate target non-terrestrial cell, the ephemeris validity duration indicates a duration for which the ephemeris information is valid for the physical random access channel communication and one or more other uplink communications in the random access channel procedure, and the common timing advance validity duration indicates a duration for which the common timing advance information is valid for the physical random access channel communication and the one or more other uplink communications in the random access channel procedure.

In an eleventh aspect, alone or in combination with one or more of the first through tenth aspects, for the candidate target non-terrestrial cell, the ephemeris validity duration indicates a first ephemeris validity duration for the physical random access channel communication and a second ephemeris validity duration for other uplink communications in the candidate target non-terrestrial cell, and the common timing advance validity duration indicates a first common timing advance validity duration for the physical random access channel communication and a second common timing advance validity duration for other uplink communications in the candidate target non-terrestrial cell.

In a twelfth aspect, alone or in combination with one or more of the first through eleventh aspects, process 800 includes initiating, for each of the one or more candidate target non-terrestrial cells, at least one of a respective ephemeris validity timer based at least in part on receiving the configuration information that indicates the ephemeris information and the ephemeris validity duration for that candidate target non-terrestrial cell or a respective common timing advance validity timer based at least in part on receiving the configuration information that indicates the common timing advance parameters and the common timing advance validity timer for that candidate target non-terrestrial cell.

In a thirteenth aspect, alone or in combination with one or more of the first through twelfth aspects, transmitting the message to initiate the conditional handover with the target base station comprises in connection with a determination that a synchronization timer associated with at least one of the ephemeris validity duration or the common timing advance validity duration for the candidate target non-terrestrial cell has not expired, transmitting the message using a timing advance calculated based at least in part on the satellite ephemeris information and the common timing advance parameters for the candidate target non-terrestrial cell.

In a fourteenth aspect, alone or in combination with one or more of the first through thirteenth aspects, the ephemeris validity duration for the candidate target non-terrestrial cell begins at a reference time associated with the satellite ephemeris information for the candidate target non-terrestrial cell.

In a fifteenth aspect, alone or in combination with one or more of the first through fourteenth aspects, the reference time associated with the satellite ephemeris information for the candidate target non-terrestrial cell is indicated in the handover command.

In a sixteenth aspect, alone or in combination with one or more of the first through fifteenth aspects, the reference time associated with the satellite ephemeris information for the candidate target non-terrestrial cell is a time offset from a slot in which the handover command is received by an RRC processing time.

In a seventeenth aspect, alone or in combination with one or more of the first through sixteenth aspects, the reference time associated with the satellite ephemeris information for the candidate target non-terrestrial cell is a time offset from a slot in which the handover command is received by a round trip time associated with the UE and the source base station.

In an eighteenth aspect, alone or in combination with one or more of the first through seventeenth aspects, the synchronization timer begins at the reference time associated with the satellite ephemeris information.

In a nineteenth aspect, alone or in combination with one or more of the first through eighteenth aspects, the synchronization timer begins at a downlink random access channel occasion slot associated with a PRACH preamble transmission in candidate target non-terrestrial cell.

In a twentieth aspect, alone or in combination with one or more of the first through nineteenth aspects, the common timing advance validity duration for the candidate target non-terrestrial cell begins at a reference time associated with the common timing advance parameters for the candidate target non-terrestrial cell.

In a twenty-first aspect, alone or in combination with one or more of the first through twentieth aspects, the timing and synchronization parameters further include at least one of a downlink frequency offset or an uplink frequency offset.

In a twenty-second aspect, alone or in combination with one or more of the first through twenty-first aspects, for each of the one or more candidate target non-terrestrial cells, the configuration information identifying the timing and synchronization parameters is included in a handover command, in an information element associated with the target non-terrestrial cell.

In a twenty-third aspect, alone or in combination with one or more of the first through twenty-second aspects, the timing and synchronization parameters further include a reference time associated with at least one of the ephemeris validity duration or the common timing advance duration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
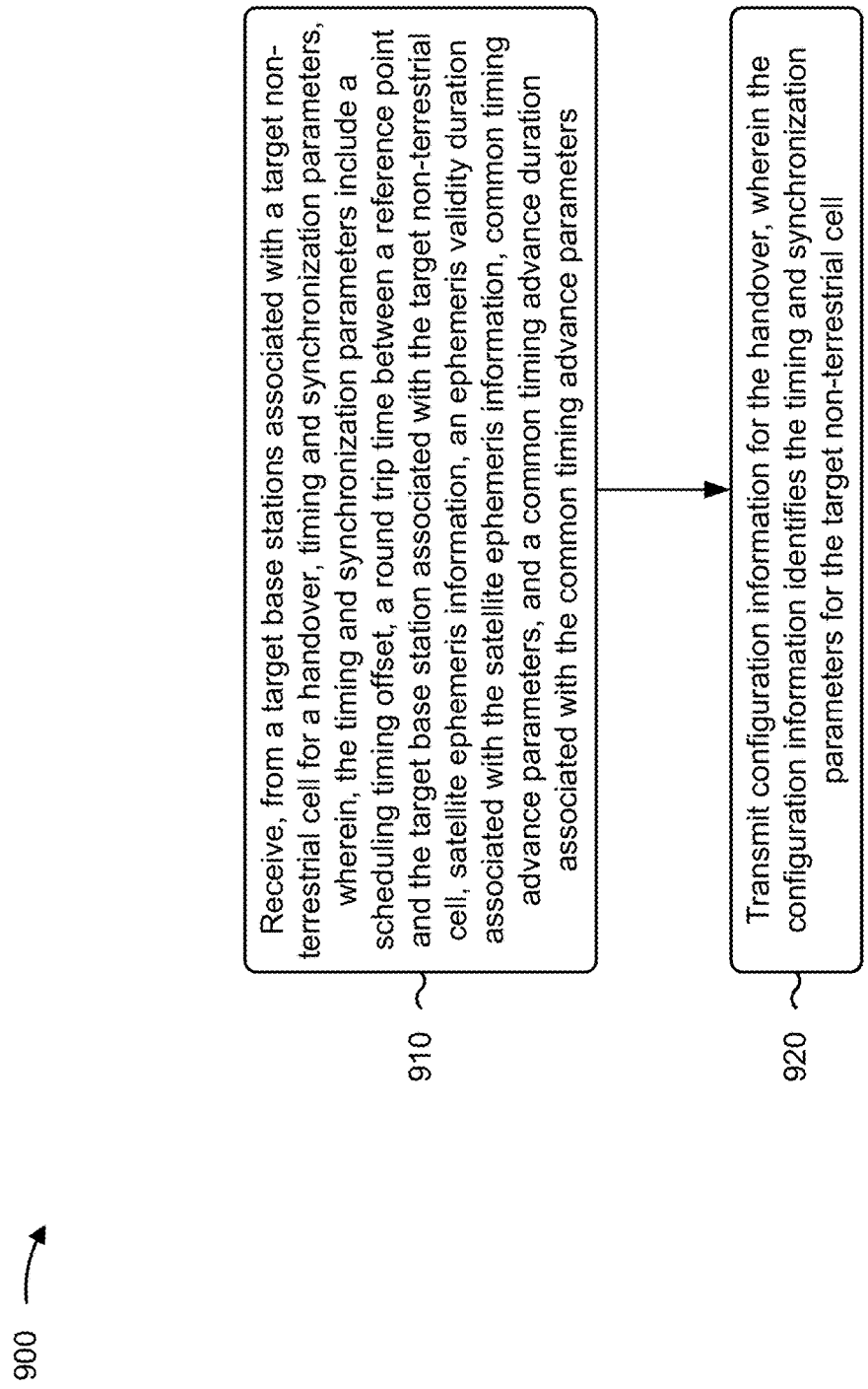

FIG. 9 is a diagram illustrating an example process 900 performed, for example, by a base station, in accordance with the present disclosure. Example process 900 is an example where the base station (e.g., base station 110) performs operations associated with signaling of timing and synchronization parameters for handover in non-terrestrial network.

As shown in FIG. 9, in some aspects, process 900 may include receiving, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters (block 910). For example, the base station (e.g., using communication manager 150 and/or reception component 1102, depicted in FIG. 11) may receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters, as described above.

As further shown in FIG. 9, in some aspects, process 900 may include transmitting, to a UE, configuration information for the handover, wherein the configuration information identifies the timing and synchronization parameters for the target non-terrestrial cell (block 920). For example, the base station (e.g., using communication manager 150 and/or transmission component 1104, depicted in FIG. 11) may transmit, to a UE, configuration information for the handover, wherein the configuration information identifies the timing and synchronization parameters for each of the one or more candidate target non-terrestrial cells, as described above.

Process 900 may include additional aspects, such as any single aspect or any combination of aspects described below and/or in connection with one or more other processes described elsewhere herein.

In a first aspect, the scheduling timing offset is a cell-specific timing offset for scheduling uplink communications to be transmitted via a satellite to the target base station associated with the target non-terrestrial cell.

In a second aspect, alone or in combination with the first aspect, the satellite ephemeris information includes an indication of a satellite ephemeris in at least one of a position-velocity-time format or a Keplerian format.

In a third aspect, alone or in combination with one or more of the first and second aspects, the common timing advance parameters include an indication of a common timing advance and derivatives of one or more orders of the common timing advance.

In a fourth aspect, alone or in combination with one or more of the first through third aspects, the timing and synchronization parameters further include at least one of a target cell stop time or target cell beam information associated with the target non-terrestrial cell.

In a fifth aspect, alone or in combination with one or more of the first through fourth aspects, the at least one of the target cell stop time or the target cell beam information is associated with at least one of a reference location, a beam center, a beam radius, or a signal strength threshold for detecting a cell edge of the target non-terrestrial cell.

In a sixth aspect, alone or in combination with one or more of the first through fifth aspects, receiving the timing and synchronization parameters comprises receiving, from one or more other base stations associated with one or more candidate target non-terrestrial cells, the timing and synchronization parameters for each of the one or more candidate target non-terrestrial cells, wherein the target non-terrestrial cell is a candidate target non-terrestrial cell of the one or more candidate target non-terrestrial cells, and wherein the configuration information identifies the timing and synchronization parameters for each of the one or more candidate target non-terrestrial cells.

In a seventh aspect, alone or in combination with one or more of the first through sixth aspects, the configuration information includes, for at least one candidate target non-terrestrial cell of the one or more candidate target non-terrestrial cells, an indication for the UE to use same timing and synchronization parameters for the at least one candidate target non-terrestrial cell as current timing and synchronization parameters associated with the source base station.

In an eighth aspect, alone or in combination with one or more of the first through seventh aspects, the handover is a conditional handover, and the configuration information is included in a handover command that further includes an execution condition.

In a ninth aspect, alone or in combination with one or more of the first through eighth aspects, for each of the one or more candidate target non-terrestrial cells, the ephemeris validity duration indicates a duration for which the ephemeris information is valid for a physical random access channel communication and one or more other uplink communications in a random access channel procedure, and the common timing advance validity duration indicates a duration for which the common timing advance information is valid for the physical random access channel communication and the one or more other uplink communications in the random access channel procedure.

In a tenth aspect, alone or in combination with one or more of the first through ninth aspects, for each of the one or more candidate target non-terrestrial cells, the ephemeris validity duration indicates a first ephemeris validity duration for a physical random access channel communication and a second ephemeris validity duration for other uplink communications in the candidate target non-terrestrial cell, and the common timing advance validity duration indicates a first common timing advance validity duration for the physical random access channel communication and a second common timing advance validity duration for other uplink communications in the candidate target non-terrestrial cell.

In an eleventh aspect, alone or in combination with one or more of the first through tenth aspects, the timing and synchronization parameters further include at least one of a downlink frequency offset or an uplink frequency offset.

In a twelfth aspect, alone or in combination with one or more of the first through eleventh aspects, the configuration information identifying the timing and synchronization parameters is included in a handover command, in an information element associated with the target non-terrestrial cell.

In a thirteenth aspect, alone or in combination with one or more of the first through twelfth aspects, the timing and synchronization parameters further include a reference time associated with at least one of the ephemeris validity duration or the common timing advance duration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
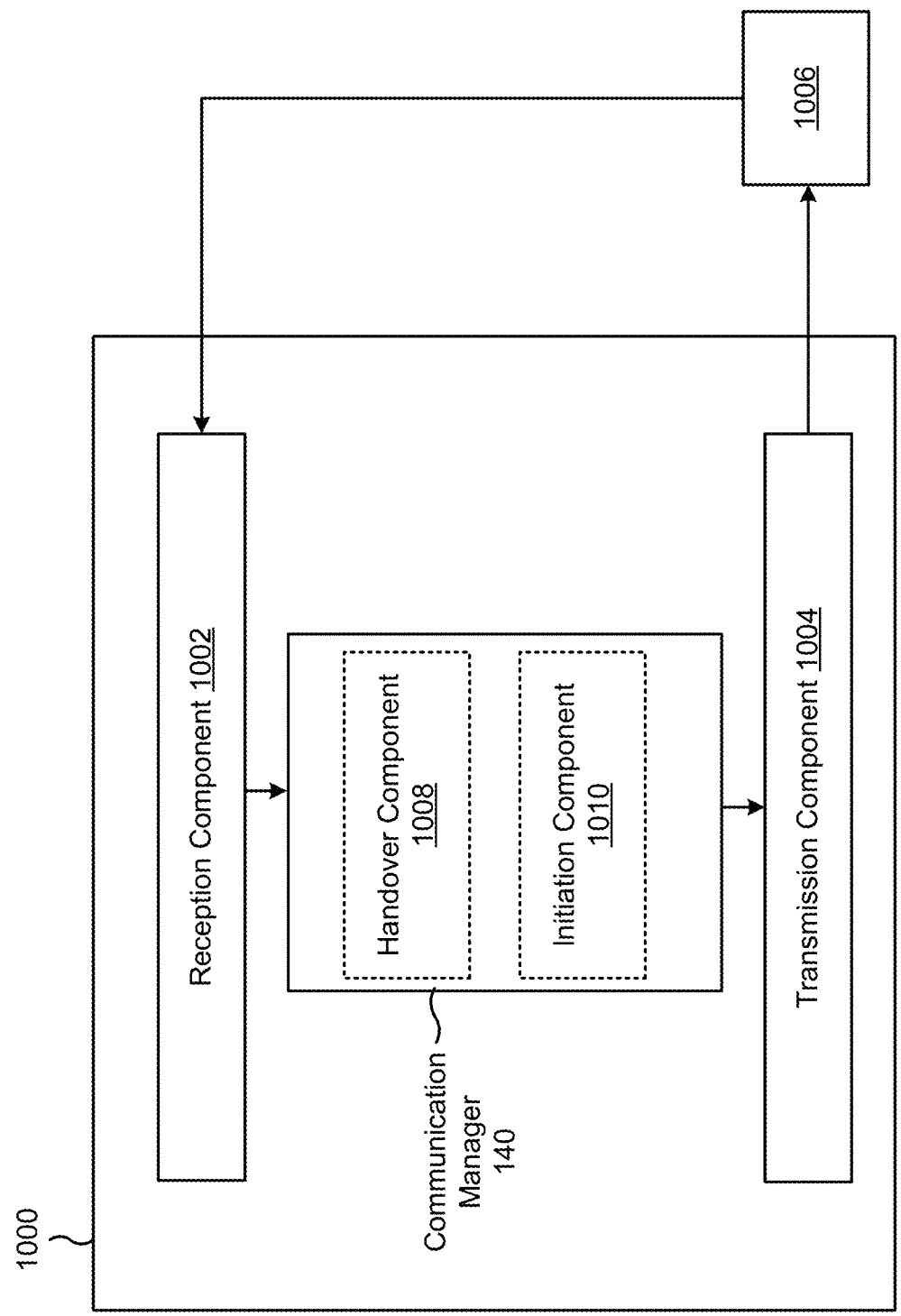
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a handover component 1008 and/or an initiation component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters. The handover component 1008 may perform the handover with the target base station associated with the target non-terrestrial cell based at least in part on the timing and synchronization parameters for the candidate target non-terrestrial cell.

The initiation component 1010 may initiate, for each of one or more candidate target non-terrestrial cells, at least one of a respective ephemeris validity timer based at least in part on receiving the configuration information that indicates the ephemeris information and the ephemeris validity duration for that candidate target non-terrestrial cell or a respective common timing advance validity timer based at least in part on receiving the configuration information that indicates the common timing advance parameters and the common timing advance validity timer for that candidate target non-terrestrial cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
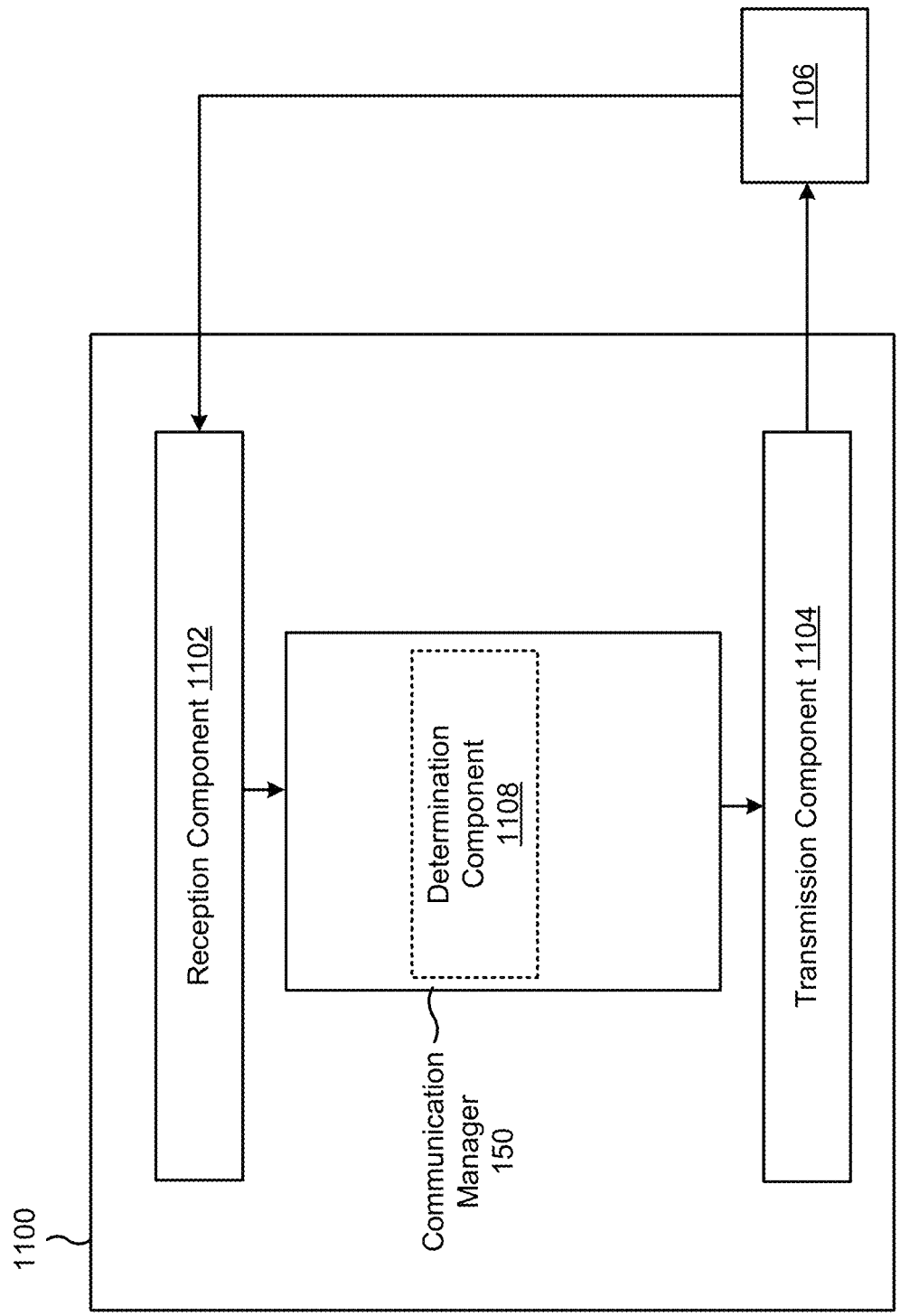

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The reception component 1102 may receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters. The transmission component 1104 may transmit, to a UE, configuration information for the handover, wherein the configuration information identifies the timing and synchronization parameters for the target non-terrestrial cell.

The determination component 1108 may determine an execution condition for a conditional handover.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters; and performing the handover with the target base station associated with the target non-terrestrial cell of the one or more candidate target non-terrestrial cells based at least in part on the timing and synchronization parameters for the target non-terrestrial cell.

Aspect 2: The method of Aspect 1, wherein the scheduling timing offset is a cell-specific timing offset for scheduling uplink communications to be transmitted via a satellite to a base station associated with the target non-terrestrial cell.

Aspect 3: The method of any of Aspects 1-2, wherein the satellite ephemeris information includes an indication of a satellite ephemeris in at least one of a position-velocity-time format or a Keplerian format.

Aspect 4: The method of any of Aspects 1-3, wherein the common timing advance parameters include an indication of a common timing advance and derivatives of one or more orders of the common timing advance.

Aspect 5: The method of any of Aspects 1-4, wherein the timing and synchronization parameters further include at least one of a target cell stop time or target cell beam information associated with the target non-terrestrial cell.

Aspect 6: The method of Aspect 5, wherein the at least one of the target cell stop time or the target cell beam information is associated with at least one of a reference location, a beam center, a beam radius, or a signal strength threshold for detecting a cell edge of that candidate target non-terrestrial cell.

Aspect 7: The method of any of Aspects 1-6, wherein the configuration information indicates the timing and synchronization parameters for each of one or more candidate target non-terrestrial cells, and wherein the target non-terrestrial cell is a candidate target non-terrestrial cell of the one or more candidate target non-terrestrial cells.

Aspect 8: The method of any of Aspect 7, wherein the configuration information includes, for at least one candidate target non-terrestrial cell of the one or more candidate target non-terrestrial cells, an indication for the UE to use same timing and synchronization parameters for the at least one candidate target non-terrestrial cell as current timing and synchronization parameters associated with the source base station.

Aspect 9: The method of any of Aspects 7-8, wherein the handover is a conditional handover, wherein the configuration information is included in a handover command that further includes an execution condition, and wherein performing the handover with the target base station associated with the target non-terrestrial cell comprises: transmitting, based at least in part on the timing and synchronization parameters for the candidate target non-terrestrial cell, a message to initiate the conditional handover with the target base station in connection with a determination that the execution condition is satisfied.

Aspect 10: The method of Aspect 9, wherein transmitting the message comprises: transmitting a physical random access channel communication to initiate a random access channel procedure to connect with the target base station.

Aspect 11: The method of Aspect 10, wherein for the candidate target non-terrestrial cell, the ephemeris validity duration indicates a duration for which the ephemeris information is valid for the physical random access channel communication and one or more other uplink communications in the random access channel procedure, and the common timing advance validity duration indicates a duration for which the common timing advance information is valid for the physical random access channel communication and the one or more other uplink communications in the random access channel procedure.

Aspect 12: The method of Aspect 10, wherein for the candidate target non-terrestrial cell, the ephemeris validity duration indicates a first ephemeris validity duration for the physical random access channel communication and a second ephemeris validity duration for other uplink communications in the candidate target non-terrestrial cell, and the common timing advance validity duration indicates a first common timing advance validity duration for the physical random access channel communication and a second common timing advance validity duration for other uplink communications in the candidate target non-terrestrial cell.

Aspect 13: The method of any of Aspects 9-12, further comprising: initiating, for each of the one or more candidate target non-terrestrial cells, at least one of a respective ephemeris validity timer based at least in part on receiving the configuration information that indicates the ephemeris information and the ephemeris validity duration for that candidate target non-terrestrial cell or a respective common timing advance validity timer based at least in part on receiving the configuration information that indicates the common timing advance parameters and the common timing advance validity timer for that candidate target non-terrestrial cell.

Aspect 14: The method of any of Aspects 9-13, wherein transmitting the message to initiate the conditional handover with the target base station comprises: in connection with a determination that a synchronization timer associated with at least one of the ephemeris validity duration or the common timing advance validity duration for the candidate target non-terrestrial cell has not expired, transmitting the message using a timing advance calculated based at least in part on the satellite ephemeris information and the common timing advance parameters for the candidate target non-terrestrial cell.

Aspect 15: The method of Aspect 14, wherein the ephemeris validity duration for the candidate target non-terrestrial cell begins at a reference time associated with the satellite ephemeris information for the candidate target non-terrestrial cell.

Aspect 16: The method of Aspect 15, wherein the reference time associated with the satellite ephemeris information for the candidate target non-terrestrial cell is indicated in the handover command.

Aspect 17: The method of Aspect 15, wherein the reference time associated with the satellite ephemeris information for the candidate target non-terrestrial cell is a time offset from a slot in which the handover command is received by a radio resource control (RRC) processing time.

Aspect 18: The method of Aspect 15, wherein the reference time associated with the satellite ephemeris information for the candidate target non-terrestrial cell is a time offset from a slot in which the handover command is received by a round trip time associated with the UE and the source base station.

Aspect 19: The method of any of Aspects 15-18, wherein the synchronization timer begins at the reference time associated with the satellite ephemeris information.

Aspect 20: The method of any of Aspects 14-18, wherein the synchronization time begins at a downlink random access channel occasion slot associated with a PRACH preamble transmission in candidate target non-terrestrial cell.

Aspect 21: The method of any of Aspects 14-20, wherein the common timing advance validity duration for the candidate target non-terrestrial cell begins at a reference time associated with the common timing advance parameters for the candidate target non-terrestrial cell.

Aspect 22: The method of any of Aspects 1-21, wherein the timing and synchronization parameters further include at least one of a downlink frequency offset or an uplink frequency offset.

Aspect 23: The method of any of Aspects 1-22, wherein, the configuration information identifying the timing and synchronization parameters is included in a handover command, in an information element associated with the target non-terrestrial cell.

Aspect 24: The method of any of Aspects 1-23, wherein the timing and synchronization parameters further include a reference time associated with at least one of the ephemeris validity duration or the common timing advance duration.

Aspect 25: A method of wireless communication performed by a base station, comprising: receiving, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters; and transmitting, to a user equipment (UE), configuration information for the handover, wherein the configuration information identifies the timing and synchronization parameters for the target non-terrestrial cell.

Aspect 26: The method of Aspect 25, wherein the scheduling timing offset is a cell-specific timing offset for scheduling uplink communications to be transmitted via a satellite to the target base station associated with the target non-terrestrial cell.

Aspect 27: The method of any of Aspects 25-26, wherein the satellite ephemeris information includes an indication of a satellite ephemeris in at least one of a position-velocity-time format or a Keplerian format.

Aspect 28: The method of any of Aspects 25-27, wherein the common timing advance parameters include an indication of a common timing advance and derivatives of one or more orders of the common timing advance.

Aspect 29: The method of any of Aspects 25-28, wherein the timing and synchronization parameters further include at least one of a target cell stop time or target cell beam information associated with the target non-terrestrial cell.

Aspect 30: The method of Aspect 29, wherein the at least one of the target cell stop time or the target cell beam information is associated with at least one of a reference location, a beam center, a beam radius, or a signal strength threshold for detecting a cell edge of the target non-terrestrial cell.

Aspect 31: The method of any of Aspects 25-30, wherein receiving the timing and synchronization parameters comprises: receiving, from one or more other base stations associated with one or more candidate target non-terrestrial cells, the timing and synchronization parameters for each of the one or more candidate target non-terrestrial cells, wherein the target non-terrestrial cell is a candidate target non-terrestrial cell of the one or more candidate target non-terrestrial cells, and wherein the configuration information identifies the timing and synchronization parameters for each of the one or more candidate target non-terrestrial cells.

Aspect 32: The method of Aspect 31, wherein the configuration information includes, for at least one candidate target non-terrestrial cell of the one or more candidate target non-terrestrial cells, an indication for the UE to use same timing and synchronization parameters for the at least one candidate target non-terrestrial cell as current timing and synchronization parameters associated with the source base station.

Aspect 33: The method of any of Aspects 31-32, wherein the handover is a conditional handover, wherein the configuration information is included in a handover command that further includes an execution condition.

Aspect 34: The method of any of Aspects 31-33, wherein for each of the one or more candidate target non-terrestrial cells, the ephemeris validity duration indicates a duration for which the ephemeris information is valid for a physical random access channel communication and one or more other uplink communications in a random access channel procedure, and the common timing advance validity duration indicates a duration for which the common timing advance information is valid for the physical random access channel communication and the one or more other uplink communications in the random access channel procedure.

Aspect 35: The method of any of Aspects 31-33, wherein for each of the one or more candidate target non-terrestrial cells, the ephemeris validity duration indicates a first ephemeris validity duration for a physical random access channel communication and a second ephemeris validity duration for other uplink communications in the candidate target non-terrestrial cell, and the common timing advance validity duration indicates a first common timing advance validity duration for the physical random access channel communication and a second common timing advance validity duration for other uplink communications in the candidate target non-terrestrial cell.

Aspect 36: The method of any of Aspects 25-35, wherein the timing and synchronization parameters further include at least one of a downlink frequency offset or an uplink frequency offset.

Aspect 37: The method of any of Aspects 25-36, wherein the configuration information identifying the timing and synchronization parameters is included in a handover command, in an information element associated with the target non-terrestrial cell.

Aspect 38: The method of any of Aspects 25-37, wherein the timing and synchronization parameters further include a reference time associated with at least one of the ephemeris validity duration or the common timing advance duration.

Aspect 39: An apparatus for wireless communication at a device, comprising a processor; memory coupled with the processor; and instructions stored in the memory and executable by the processor to cause the apparatus to perform the method of one or more of Aspects 1-24.

Aspect 40: A device for wireless communication, comprising a memory and one or more processors coupled to the memory, the one or more processors configured to perform the method of one or more of Aspects 1-24.

Aspect 41: An apparatus for wireless communication, comprising at least one means for performing the method of one or more of Aspects 1-24.

Aspect 42: A non-transitory computer-readable medium storing code for wireless communication, the code comprising instructions executable by a processor to perform the method of one or more of Aspects 1-24.

Aspect 43: A non-transitory computer-readable medium storing a set of instructions for wireless communication, the set of instructions comprising one or more instructions that, when executed by one or more processors of a device, cause the device to perform the method of one or more of Aspects 1-24.

Aspect 44: An apparatus for wireless communication at a device, comprising a processor; memory coupled with the processor; and instructions stored in the memory and executable by the processor to cause the apparatus to perform the method of one or more of Aspects 25-38.

Aspect 45: A device for wireless communication, comprising a memory and one or more processors coupled to the memory, the one or more processors configured to perform the method of one or more of Aspects 25-38.

Aspect 46: An apparatus for wireless communication, comprising at least one means for performing the method of one or more of Aspects 25-38.

Aspect 47: A non-transitory computer-readable medium storing code for wireless communication, the code comprising instructions executable by a processor to perform the method of one or more of Aspects 25-38.

Aspect 48: A non-transitory computer-readable medium storing a set of instructions for wireless communication, the set of instructions comprising one or more instructions that, when executed by one or more processors of a device, cause the device to perform the method of one or more of Aspects 25-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters; and
      perform the handover with the target base station associated with the target non-terrestrial cell based at least in part on the timing and synchronization parameters for the target non-terrestrial cell.

2. The UE of claim 1, wherein the scheduling timing offset is a cell-specific timing offset for scheduling uplink communications to be transmitted via a satellite to the target base station associated with the target non-terrestrial cell.

3. The UE of claim 1, wherein the satellite ephemeris information includes an indication of a satellite ephemeris in at least one of a position-velocity-time format or a Keplerian format.

4. The UE of claim 1, wherein the common timing advance parameters include an indication of a common timing advance and derivatives of one or more orders of the common timing advance.

5. The UE of claim 1, wherein the timing and synchronization parameters further include at least one of a target cell stop time or target cell beam information associated with the target non-terrestrial cell, and wherein the at least one of the target cell stop time or the target cell beam information is associated with at least one of a reference location, a beam center, a beam radius, or a signal strength threshold for detecting a cell edge of the target non-terrestrial cell.

6. The UE of claim 1, wherein the configuration information indicates the timing and synchronization parameters for each of one or more candidate target non-terrestrial cells, and wherein the target non-terrestrial cell is a candidate target non-terrestrial cell of the one or more candidate target non-terrestrial cells.

7. The UE of claim 6, wherein the configuration information includes, for at least one candidate target non-terrestrial cell of the one or more candidate target non-terrestrial cells, an indication for the UE to use same timing and synchronization parameters for the at least one candidate target non-terrestrial cell as current timing and synchronization parameters associated with the source base station.

8. The UE of claim 6, wherein the handover is a conditional handover, wherein the configuration information is included in a handover command that further includes an execution condition, and wherein the one or more processors, to perform the handover with the target base station associated with the target non-terrestrial cell, are configured to:
   transmit, based at least in part on the timing and synchronization parameters for the candidate target non-terrestrial cell, a message to initiate the conditional handover with the target base station in connection with a determination that the execution condition is satisfied.

9. The UE of claim 8, wherein the one or more processors, to transmit the message, are configured to:
transmit a physical random access channel communication to initiate a random access channel procedure to connect with the target base station.

10. The UE of claim 9, wherein for the candidate target non-terrestrial cell, the ephemeris validity duration indicates a duration for which the ephemeris information is valid for the physical random access channel communication and one or more other uplink communications in the random access channel procedure, and the common timing advance validity duration indicates a duration for which the common timing advance information is valid for the physical random access channel communication and the one or more other uplink communications in the random access channel procedure.

11. The UE of claim 9, wherein for the candidate target non-terrestrial cell, the ephemeris validity duration indicates a first ephemeris validity duration for the physical random access channel communication and a second ephemeris validity duration for other uplink communications in the candidate target non-terrestrial cell, and the common timing advance validity duration indicates a first common timing advance validity duration for the physical random access channel communication and a second common timing advance validity duration for other uplink communications in the candidate target non-terrestrial cell.

12. The UE of claim 8, wherein the one or more processors are further configured to:
initiate, for each of the one or more candidate target non-terrestrial cells, at least one of a respective ephemeris validity timer based at least in part on receiving the configuration information that indicates the ephemeris information and the ephemeris validity duration for that candidate target non-terrestrial cell or a respective common timing advance validity timer based at least in part on receiving the configuration information that indicates the common timing advance parameters and the common timing advance validity timer for that candidate target non-terrestrial cell.

13. The UE of claim 8, wherein the one or more processors, to transmit the message to initiate the conditional handover with the target base station, are configured to:
in connection with a determination that a synchronization timer associated with at least one of the ephemeris validity duration or the common timing advance validity duration for the candidate target non-terrestrial cell has not expired, transmitting the message using a timing advance calculated based at least in part on the satellite ephemeris information and the common timing advance parameters for the candidate target non-terrestrial cell.

14. The UE of claim 13, wherein the ephemeris validity duration for the candidate target non-terrestrial cell begins at a reference time associated with the satellite ephemeris information for the candidate target non-terrestrial cell, and wherein the reference time associated with the satellite ephemeris information for the candidate target non-terrestrial cell is indicated in the handover command.

15. The UE of claim 14, wherein the synchronization timer begins at the reference time associated with the satellite ephemeris information.

16. The UE of claim 13, wherein the common timing advance validity duration for the candidate target non-terrestrial cell begins at a reference time associated with the common timing advance parameters for the candidate target non-terrestrial cell.

17. The UE of claim 1, wherein the configuration information identifying the timing and synchronization parameters is included in a handover command, in an information element associated with the target non-terrestrial cell.

18. A base station, comprising:
a memory; and
one or more processors, coupled to the memory, configured to:
receive, from a target base station associated with a target non-terrestrial cell for a handover, timing and synchronization parameters, wherein the timing and synchronization parameters include a scheduling timing offset, a round trip time between a reference point and the target base station associated with the target non-terrestrial cell, satellite ephemeris information, an ephemeris validity duration associated with the satellite ephemeris information, common timing advance parameters, and a common timing advance duration associated with the common timing advance parameters; and
transmit, to a user equipment (UE), configuration information for the handover, wherein the configuration information identifies the timing and synchronization parameters for the target non-terrestrial cell.

19. The base station of claim 18, wherein the one or more processors, to receive the timing and synchronization parameters, are configured to:
receive, from one or more other base stations associated with one or more candidate target non-terrestrial cells, the timing and synchronization parameters for each of the one or more candidate target non-terrestrial cells, wherein the target non-terrestrial cell is a candidate target non-terrestrial cell of the one or more candidate target non-terrestrial cells, and wherein the configuration information identifies the timing and synchronization parameters for each of the one or more candidate target non-terrestrial cells.

20. The base station of claim 19, wherein the handover is a conditional handover, and wherein the configuration information is included in a handover command that further includes an execution condition.

21. The base station of claim 18, wherein the timing and synchronization parameters further include a reference time associated with at least one of the ephemeris validity duration or the common timing advance duration.

22. A method of wireless communication performed by a user equipment (UE), comprising:
receiving, from a source base station, configuration information for a handover, wherein the configuration information indicates, for a target non-terrestrial cell, timing and synchronization parameters including a scheduling timing offset, a round trip time between a reference point and a target base station associated with the target non-terrestrial cell, satellite ephemeris information, an ephemeris validity duration associated with the satellite ephemeris information, common timing advance parameters, and a common timing advance validity duration associated with the common timing advance parameters; and
performing the handover with the target base station associated with the target non-terrestrial cell based at least in part on the timing and synchronization parameters for the target non-terrestrial cell.

23. The method of claim 22, wherein the scheduling timing offset is a cell-specific timing offset for scheduling uplink communications to be transmitted via a satellite to the target base station associated with the target non-terrestrial cell.

24. The method of claim 22, wherein the configuration information indicates the timing and synchronization parameters for each of one or more candidate target non-terrestrial cells, and wherein the target non-terrestrial cell is a candidate target non-terrestrial cell of the one or more candidate target non-terrestrial cells.

25. The method of claim 24, wherein the handover is a conditional handover, wherein the configuration information is included in a handover command that further includes an execution condition, and wherein performing the handover with the target base station associated with the target non-terrestrial cell comprises:
transmitting, based at least in part on the timing and synchronization parameters for the candidate target non-terrestrial cell, a message to initiate the conditional handover with the target base station in connection with a determination that the execution condition is satisfied.

26. The method of claim 25, wherein transmitting the message to initiate the conditional handover with the target base station comprises:
in connection with a determination that a synchronization timer associated with at least one of the ephemeris validity duration or the common timing advance validity duration for the candidate target non-terrestrial cell has not expired, transmitting the message using a timing advance calculated based at least in part on the satellite ephemeris information and the common timing advance parameters for the candidate target non-terrestrial cell, wherein the synchronization timer begins at a reference time indicated in the handover command.

27. A method of wireless communication performed by a base station, comprising:
receiving, from one or more other base stations associated with one or more candidate target non-terrestrial cells for a handover, timing and synchronization parameters, wherein for each of the one or more candidate target non-terrestrial cells, the timing and synchronization parameters include a scheduling timing offset, a round trip time between a reference point and a base station associated with the candidate target non-terrestrial cell, satellite ephemeris information, an ephemeris validity duration associated with the satellite ephemeris information, common timing advance parameters, and a common timing advance duration associated with the common timing advance parameters; and
transmitting, to a user equipment (UE), configuration information for the handover, wherein the configuration information identifies the timing and synchronization parameters for each of the one or more candidate target non-terrestrial cells.

28. The method of claim 27, wherein receiving the timing and synchronization parameters comprises:
receiving, from one or more other base stations associated with one or more candidate target non-terrestrial cells, the timing and synchronization parameters for each of the one or more candidate target non-terrestrial cells, wherein the target non-terrestrial cell is a candidate target non-terrestrial cell of the one or more candidate target non-terrestrial cells, and wherein the configuration information identifies the timing and synchronization parameters for each of the one or more candidate target non-terrestrial cells.

29. The method of claim 28, wherein the handover is a conditional handover, and wherein the configuration information is included in a handover command that further includes an execution condition.

30. The method of claim 27, wherein the timing and synchronization parameters further include a reference time associated with at least one of the ephemeris validity duration or the common timing advance duration.

* * * * *